US009190254B1

(12) United States Patent
Hanson

(10) Patent No.: US 9,190,254 B1
(45) Date of Patent: Nov. 17, 2015

(54) ION TRAP MASS ANALYZER APPARATUS, METHODS, AND SYSTEMS UTILIZING ONE OR MORE MULTIPLE POTENTIAL ION GUIDE (MPIG) ELECTRODES

(71) Applicant: UNIVERSITY OF NORTHERN IOWA RESEARCH FOUNDATION, Cedar Falls, IA (US)

(72) Inventor: Curtiss Dwight Hanson, Cedar Falls, IA (US)

(73) Assignee: University of Northern Iowa Research Foundation, University of Northern Iowa, Cedar Falls, IA (US)

( * ) Notice: Subject to any disclaimer, the term of this patent is extended or adjusted under 35 U.S.C. 154(b) by 0 days.

(21) Appl. No.: 14/570,529

(22) Filed: Dec. 15, 2014

Related U.S. Application Data

(63) Continuation of application No. 13/758,282, filed on Feb. 4, 2013, now Pat. No. 8,933,397.

(60) Provisional application No. 61/594,127, filed on Feb. 2, 2012.

(51) Int. Cl.

| | |
|---|---|
| ***B01D 59/46*** | (2006.01) |
| ***B01D 59/44*** | (2006.01) |
| ***H01J 49/28*** | (2006.01) |
| ***H01J 49/00*** | (2006.01) |
| ***H01J 49/06*** | (2006.01) |
| ***H01J 49/10*** | (2006.01) |
| ***H01J 9/14*** | (2006.01) |

(52) U.S. Cl.
CPC ................ *H01J 49/065* (2013.01); *H01J 9/14* (2013.01); *H01J 49/10* (2013.01)

(58) Field of Classification Search
USPC ................................ 250/281–283, 288, 292
See application file for complete search history.

(56) References Cited

U.S. PATENT DOCUMENTS

| | | | | |
|---|---|---|---|---|
| 5,770,859 | A | 6/1998 | Bielawski | |
| 6,013,913 | A | 1/2000 | Hanson | |
| 6,111,250 | A | 8/2000 | Thomson | |
| 6,570,152 | B1 | 5/2003 | Hoyes | |
| 6,657,190 | B2 * | 12/2003 | Hanson et al. | 250/287 |
| 6,674,071 | B2 | 1/2004 | Franzen et al. | |
| 6,723,986 | B2 * | 4/2004 | Kernan et al. | 250/292 |
| 6,777,671 | B2 | 8/2004 | Doroshenko | |
| 6,872,941 | B1 | 3/2005 | Whitehouse et al. | |
| 7,323,683 | B2 | 1/2008 | Krutchinsky et al. | |
| 7,755,040 | B2 | 7/2010 | Li et al. | |

(Continued)

*Primary Examiner* — Bernard E Souw
(74) *Attorney, Agent, or Firm* — McKee, Voorhees & Sease, PLC

(57) ABSTRACT

In one aspect of the invention, an ion trap mass analyzer includes a variable- or multi-potential type ion guide (MPIG) assembly which has been pre-configured to produce a parabolic-type potential field. Each MPIG electrode has a resistive coating of designed characteristics. In one example the coating varies in thickness along the length of an underlying uniform substrate. The MPIG assembly can be a single MPIG electrode or an array of a plurality of MPIG electrodes. An array can facilitate delocalization for improved performance. This chemical modification of a uniform underlying substrate promotes cheaper and flexible instruments. The modified MPIG electrodes also allow miniaturization (e.g. micro and perhaps even nano-scale), which allows miniaturization of the instrument in which the single or plural modified MPIG electrode(s) are placed. This promotes portability and field use instead of limitation to laboratory settings.

20 Claims, 23 Drawing Sheets

(56) References Cited

U.S. PATENT DOCUMENTS

| | | | |
|---|---|---|---|
| 7,767,960 B2 | 8/2010 | Makarov | |
| 7,820,961 B2 | 10/2010 | Hashimoto et al. | |
| 7,858,930 B2 | 12/2010 | Kaiser et al. | |
| 7,960,692 B2 | 6/2011 | Dobson et al. | |
| 8,933,397 B1 * | 1/2015 | Hanson | 250/287 |
| 2002/0195557 A1 * | 12/2002 | Hanson et al. | 250/287 |
| 2003/0178564 A1 * | 9/2003 | Kernan et al. | 250/292 |
| 2004/0178342 A1 * | 9/2004 | Kernan et al. | 250/292 |
| 2005/0121609 A1 | 6/2005 | Makarov et al. | |

* cited by examiner

ION TRAP MASS ANALYZER APPARATUS, METHODS, AND SYSTEMS UTILIZING ONE OR MORE MULTIPLE POTENTIAL ION GUIDE (MPIG) ELECTRODES

CROSS-REFERENCE TO RELATED APPLICATIONS

This application is a continuation application of Ser. No. 13/758,282 filed Feb. 4, 2013, which claims priority under 35 U.S.C. §119 to provisional application Ser. No. 61/594,127 filed Feb. 2, 2012, hereby incorporated by reference in their entirety.

I. BACKGROUND OF THE INVENTION

A. Field of the Invention

The present invention relates generally to mass spectroscopy and, more particularly, to ion trap mass analysis and analyzers and, further, to specific types of MPIG electrode configurations and methods of use thereof in that context.

B. Discussion of the State of the Art

Advances in modern science have always required the development of new methods of analysis. The evolution of modern instrumentation permits the rapid identification of molecules and allows investigations of structure and reactivity from the atomic scale to the macromolecular scale. Within the last two decades the field of mass spectrometry has become a fundamental method of molecular analysis in the field of biological science[i, ii, iii, iv]. Its utility ranges from simple molecular weight determination to proteomics and protein sequencing[v, vi, vii]. Although initially limited to small volatile and thermally stable molecules, the real impact of modern mass spectrometry is the wide array of information possible coupled with the high sensitivity of the technique when applied to biologically important molecules.

Investigations of macromolecules by mass spectrometry were historically limited by the inability to produce gas phase ions from large nonvolatile and thermally labile samples. With the development of desorption/ionization techniques, mass spectrometry has become an important tool in the area of biological research[viii, ix, x]. The need for mass spectrometry methods capable of analyzing biomolecules has led to the expansion of time-of-flight mass spectrometry (TOF-MS) over the past twenty years. The high sensitivity and high mass range of TOF-MS coupled with external ion sources that produce ions from solution or atmospheric pressure has made TOF-MS a common laboratory technique. While TOF-MS provides high sensitivity mass measurements at high mass, it lacks a direct method of performing linked scans for isolating specific ions for in-depth structural studies. These types of in-depth investigations are typically performed on high performance instruments involving ion trap technology such as quadrupole ion traps[xi], Fourier transform ion cyclotron resonance (FT-ICR) instruments[xii] or more recently, orbitrap analyzers[xiii]. Although FT-ICR and orbitrap analyzers have the capacity for high mass analysis, the high cost and limited access to these instruments limits their impact on the biological sciences.

Ion trap technologies have long been recognized for their inherent utility in molecular detection and analysis. Ions can be trapped for long periods of time providing the potential for collection and storage of molecules that exist in trace quantities in order to build up a detectable amount for structural studies. The ability to manipulate ions while in the ion trap permits a wide range of investigations including structurally significant tandem mass spectrometry experiments (i.e., MS-MS and MS$^n$). Such mass analysis in an ion trap requires the creation of magnetic or electric fields that can differentiate between ions of different mass. The increased need for this type of analysis of biological samples has led to the production of ion-trap instruments using expensive high field super conducting magnets and specialized shaped electrodes. Because these instruments produce a relatively small area of the required homogeneity, only a limited number of ions can be stored without problems of space charge repulsion. The inherent problem of ion repulsion in these ions traps ultimately limits the dynamic range of the instrumentation[xiv].

Orbital ion trapping dates back to 1923 with the introduction of the Kingdon trap[xv]. The design of this ion trap featured a hollow cylindrical electrode and a thin, wire filament which ran coaxial to the outer cylindrical electrode. The electric field generated by the wire electrode effectively trapped ions in a potential well relative to the reference potential generated by the outer cylinder electrode. When a negative voltage was placed on the center wire electrode relative to the outer cylinder, a potential field was formed that attracted positive charged ions towards the wire electrode. The angular velocity of the ions would cause the particles to orbit the EPG, effectively trapping them in the radial direction. Ions that are accelerated slightly perpendicular to the ion optical axis are captured in the potential field and transported to the detector resulting in orbital trapping of the ions in a radial direction. The addition of positively charged electrostatic electrodes placed at the ends of the cylinder electrode would create an orthogonal potential well that would trap the ions in the axial direction creating an effective ion trap. This basic design was improved in 1985 by Knight by changing the shapes of the end cap electrodes to a chevron geometry. By changing the shapes of the electrodes, the field lines produced created a more effective ion trap. Although both the Kingdon and Knight traps have found application when coupled with mass analyzers, there is no mass dependent frequency created by the electrostatic fields and therefore no method for mass analysis within the trap. This concept was later used by Oakey and McFarlane to increase ion transmission in TOF mass spectrometry[xvi]. An electrostatic wire electrode was positioned in the drift region of the TOF flight tube creating a potential field in the center which effectively "guided" ions to the detector. Ions that are slightly divergent to the ion optical axis are redirected back towards the detector by the potential field resulting in a dramatic improvement in sensitivity[xvii, xviii].

In addition to improved transmission efficiency of ions, Macfarlane demonstrated the utility of the electrostatic ion guide for elimination of neutrals[xix] and ion elimination[xx]. Research performed in my laboratory later demonstrated that selective ion elimination could be accomplished using a pulsed bipolar ion guide[xxi, xxii]. Recently, this approach was used to create a multi-pass time-of-flight mass spectrometer. In this instrument, ions are effectively trapped in an elongated Kingdon trap by positioning two reflecting electrodes at the extremes of the TOF analyzer[xxiii, xxiv]. Ions traveling through the drift region between the reflecting fields are continually redirected by the potential field of the ion guide resulting in an enhancement in sensitivity and resolution. In addition, this approach also permits ion selection experiments to be performed by the pulsed ejection of unwanted ions. Although the ion guide effectively traps the ions within the drift region between the reflection fields, the single electrostatic potential generated by the wire ion guide cannot be used with the constantly increasing field of a reflectron instrument. To address this issue, a multi-potential electrode was developed in my laboratory to provide increased ion trapping efficiency in reflecting electric fields. The electrode was created by coating a non-conducting substrate with resistive materials and controlling the voltage at the extremes of the electrode. By varying the resistivity of the surface, the electrode acts as a voltage divider providing a continuum of electric potentials in contrast to the uniform field of the electrostatic wire ion guide. In this manner, a multi-potential ion guide (MPIG) was constructed for use in a reflectron that increased the ion transmission efficiency by an order of magnitude[xxv].

Although the ability to mass analyze trapped ions was explored in the early 1950's using an ExB ion trap, the ability to mass analyze trapped ions without the use of a magnetic field was expanded with the development of the Paul quadrupole ion trap in the early 1960's. The Paul ion trap utilized hyperbolic shaped electrodes to create quadrupolar field lines permitting molecular weight determination by the mass dependent effect of an applied rf field. The sympathetic motion of the ions with the oscillating electric field results in a mass selective stability of ions within the trap. The resulting mass dependent stability can be used to either selectively eject ions into a detector or selectively store them for ms-ms type experiments. The flexibility and robust nature of this design has made the quadrupole ion trap a very effective method of mass analysis.

In contrast to the Paul trap which uses oscillating electric fields for mass analysis, the concept of mass selective orbital trapping in an electrostatic ion trap was recently introduced with the development of the orbitrap. The design of the orbitrap improved upon the Knight trap by changing the shape of the center electrodes. The design featured an outer barrel-like electrode and a shaped inner spindle-like electrode. When voltage was then applied between the two electrodes, an electrostatic field was generated capable of trapping ions. Owing to the electrostatic field lines created between the shaped inner electrode and the outer barrel electrode, motion in the z or axial direction is independent of angular and radial motion. Because the axial motion is independent of initial energy and spatial spread of the ions within the trap, the motion can be described as harmonic. This allows for axial frequency to be used for determination of the m/z ratio.

Similar to methods of detection in FT-ICR (Fourier transform ion cyclotron resonance) instruments, detection of ion frequency by image current detection is possible in the orbitrap. By amplifying the induced signal voltage produced of trapped ions as they oscillate, the sum of the image current will include the individual frequencies of ions trapped. This has been achieved in the orbitrap, by splitting the outer electrode and attaching a differential amplifier and detecting an image current. In addition to utilizing detection of an image current, the orbitrap instruments are able to operate in mass-selective instability mode. In this mode, oscillating electric fields or Rf voltage is floated upon the high voltage of the center electrode while the split outer electrodes remained at ground. When Rf voltage is applied to the center electrode at a frequency resonant to axial ion oscillation frequency, the axial component is amplified until the resonant ions are ejected along the axis. By positioning a photomultiplier along this axis, the ejected ions can be detected.

Another example of mass analysis in an electrostatic ion trap was demonstrated by me using a multi-pass reflectron time-of flight (TOF) mass spectrometer (see, e.g., U.S. Pat. No. 6,013,913 to Dr. Curtiss Hanson, which is incorporated by reference herein). Typically reflectrons are included in TOF instruments to focus kinetic energy differences between ions of the same mass thus increasing the mass resolution of the instrument. A TOF system that contains two coaxial reflectrons becomes similar in design to the Kingdon trap with ions trapped in the radial direction by an EPG electrode and axially by the two reflectrons. Ions can be reflected back and forth with the minors increasing the net flight length and permitting kinetic energy focusing for enhanced resolution. Similar to the mass instability mode of the orbitrap, ion detection is accomplished by dropping the applied voltage on one of the reflectrons, with mass analysis achieved by the time of flight to the detector.

The efficiency of ion transmission and storage in a multi pass TOF system is limited due to radial dispersion of the ions while in the reflectron region. Because the homogeneous electric field generated by an electrostatic EPG is incompatible with the constantly changing fields needed for a reflectron, there exists no trapping of the ions in the radial direction while in the reflectron field. The lack of the radial trapping field leads to ion dispersion and loss of transmission efficiency. This problem was addressed though the application of a multi-potential ion guide (MPIG). An MPIG is an electrode that is created by coating a non-conducting substrate with resistive materials and controlling the voltage at the extremes of the electrode. By varying the resistivity of the surface, the electrode acts as a voltage divider providing a continuum of electric potentials in contrast to the uniform field of the electrostatic wire ion guide. In this manner, a multi-potential ion guide (MPIG) was constructed for use in a reflectron that produced an electric field that was shaped to match the changing potential of the reflectron. The application of the MPIG in the reflectron region permitted continuous ion trapping in the radial direction while in the reflectron region resulting in increased ion transmission efficiency by an order of magnitude.

Trace chemical analysis is becoming increasingly important in today's society. Compound and molecular identification impacts all areas of industry and environmental monitoring as well as the medical field and law enforcement. As the need for more information about substances has grown, the necessity for sensors capable of providing detailed molecular information has also grown. Although highly sensitive detectors have been developed for identification of specific species or compounds, they are typically large instruments confined to laboratories. There continues to be a growing need for small portable analyzers that can provide information about a wide range of compounds that exist only in trace quantities in the environment that are suitable for work in both the laboratory and in the field.

Over the last decade, mass spectrometry has risen to the forefront of trace molecular identification ([xxvi, xxvii, xxviii, xxix, xxx, xxxi]). Evidence of its proliferation is seen not only in the news reports of environmental monitoring and law enforcement, but also in popular media where laboratories are often shown using mass spectrometry to identify any unknown. The utility of mass spectrometry is marked by its ability to provide specific structural and molecular identification of unknown compounds from only trace levels of samples. Its combination of high sensitivity as well as powerful specificity makes it the analyzer of choice for many applications. The applications are vast, from drug and explosive testing in law enforcement to pesticide and toxin identification in the environment. Initially, mass spectrometry was an expensive technique that was found only in the most technical laboratories. Today mass spectrometers can be found in almost every analytical laboratory and hospital. As the cost and size of these instruments has decreased, their impact has grown in an increasing range of applications.

The term mass spectrometry refers to the analysis and identification of compounds by measuring their molecular mass. In the simplest sense, the analyzer is similar to a balance, weighing the molecule and evaluating its structure on the basis of its mass. There are many types of mass analyzers because of the large number of methods available for separating and measuring masses of particles. Just as balances for determining the weight of objects have developed over time, so have the instruments for measuring masses of molecules. Since the early 1980's technological advances have led to the development of a number of different instruments for mass spectrometric analysis. These new generation mass spectrometers have increased the sensitivity and versatility of the technique by trapping ions for prolonged periods of time, allowing enhanced chemical study. These ion trap analyzers have typically relied on quadrupolar electric fields ([xxxii, xxxiii, xxxiv, xxxv]) or crossed electric and magnetic fields ([xxxvi, xxxvii]) to both contain and analyze the molecules. Although the versatility and performance of these ion trap analyzers make them a valuable technique for trace molecular analysis ([xxxviii, xxxix]), the high cost of the instruments limits their broader use.

Creation of the electric fields needed to trap and analyze molecules has always relied on producing uniquely shaped electrodes that will provide the desired effect. These complex shaped electrodes are often both difficult and expensive to produce, resulting in high cost and an inability to reduce the size of the instrument which limits the portability and range of implementation of the spectrometer. In my laboratory at the University of Northern Iowa, we developed a new method of producing electrodes in which insulators are coated with semiconductor polymers ([xi]). By varying the conductivity of the surface of the electrode, it is possible to create complex shaped electric fields through chemical modification rather than physical manipulation of the shape of the electrode. Using this approach, a single chemically modified electrode can be used to create any potential surface desired. This system provides an alternative method of electric field generation and has been used to develop new methods of mass analysis.

The concept of a MPIG is described in detail (called "variable potential ion guide) in U.S. Pat. No. 6,657,190 to Dr. Curtiss Hanson and Paul Trent and is incorporated by reference herein. Using this approach, it is possible to create a user defined electric field by altering the resistivity of the surface of an electrode.

However, the inventor has identified there is room for improvement in the state of the art, and discovered that principles from his prior work can be applied in beneficial ways in the context of ion trap mass analyzers.

II. SUMMARY OF THE INVENTION

Based on the design of the MPIG electrode of U.S. Pat. No. 6,657,190, I have just completed tests of a method of mass analysis. This ion trap mass spectrometer system is characterized by the ability to trap and measure the mass of molecules using a single strand electrode that has been chemically modified to produce a parabolic field.

This new approach represents an important step towards developing a miniaturized mass analyzer that could be easily used anywhere that molecular identification is required. The laboratory data from this instrument demonstrates the ability to separate and analyze molecules on the basis of their mass. In addition, the instrument has been shown to have a remarkable ability to store molecules for long periods of time, permitting not only simple mass analysis but also the ability to perform more complex studies of the structure which is required for complete compound identification.

The basis for this new method of analysis is the creation of a true parabolic electric field generated by an array of multi-potential ion guides (MPIG) electrodes. The field generated by coating the surface of an insulator with a semi-conductive polymer produces a continuum of user defined potentials. The laboratory data from this instrument demonstrates the ability to separate and analyze molecules based on the frequency of motion in a parabolic potential energy field. The instrument has demonstrated not only the ability to store molecules for long periods of time, but also provides the ability to perform more complex studies of the structure which is required for complete compound identification. In contrast to electric fields that are created by the physical shape of the electrode (e.g., quadrupole ions traps and orbitrap analyzers), this design provides a route to an inexpensive high performance mass analyzer. An array of such guide electrodes promotes the benefit of delocalization, which can improve performance.

Therefore, a principle object, feature, aspect, or advantage of the present invention is an apparatus, method, and/or system which represent(s) improvements or enhancements to the state of the art and/or solves or improves over problems and deficiencies in the state of the art.

Other objects, features, aspects, or advantages of the present invention are a mass analysis apparatus, method, or system which provides one or more of the following:

a. ability to handle a wide range of molecules and masses;

b. ability to perform linked scans, e.g. for isolating specific ions for in-depth structural studies (e.g. MS-MS and $MS^n$);

c. economic and efficient manufacture and use, including at a significantly lower cost than at least many or most existing methods;

d. expansion of the area of homogeneity of the trapping field by delocalization to, for example, address space-charge repulsion problems, and support detection over an increased area to increase dynamic range while enhancing limits of detection;

e. good ion transmission efficiency;

f. avoidance of preconditioning of ions before processing in the ion trap mass analyzer;

g. ability to be scaled up or down in size; including miniaturized (e.g. to micro- or nano-scale), to expand flexibility of use including to allow field use instead of acquisition of samples and transport to a laboratory.

h. high flexibility including the number of MPIG electrodes, the nature and configuration of the MPIG electrodes, and the applications to which they are used (e.g. a variety of mass analysis applications, a variety of detection applications, selective elimination of ions, linked tests, etc.).

In one aspect of the invention, an ion trap mass analyzer includes a variable- or multi-potential ion guide (MPIG) assembly which has been pre-configured to produce a parabolic field. Each MPIG electrode has a resistive coating of designed characteristics. In one example the coating varies in thickness along the length of an underlying uniform substrate. The MPIG assembly can be a single MPIG electrode or an array of a plurality of MPIG electrodes. An array can facilitate delocalization for improved performance. This chemical modification of a uniform underlying substrate promotes cheaper and flexible instruments. Variations in the coating are easy to make and apply. Also, this paradigm provides the ability to miniaturize these instruments. This can allow field use outside a laboratory for a variety of useful tasks. The paradigm allows a variety of analysis methods, and compatibility with tandem or other analysis methods.

These and other objects, features, aspects or advantages of the present invention will become more apparent with reference to the accompanying specification.

III. BRIEF DESCRIPTION OF THE DRAWINGS

From time-to-time in this description reference will be taken to the attached Drawings, which are identified and summarized below. These Drawings are a part of and incorporated by reference to this specification.

Figure 3A:
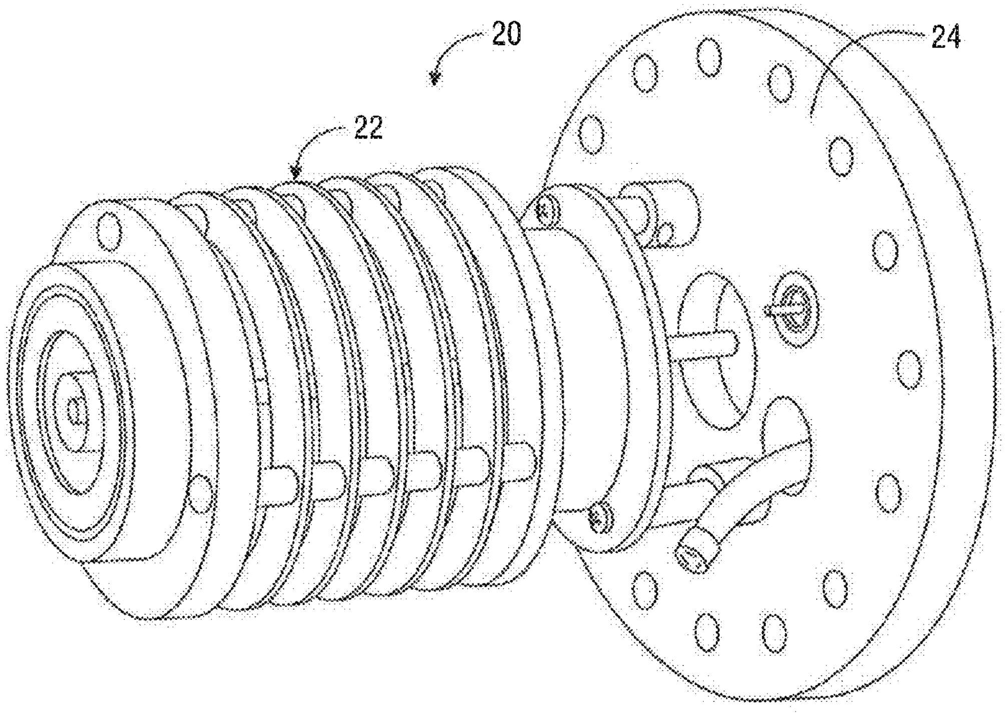
FIG. 3A is a reduced-in-scale perspective view of an analytical instrument, referred to here as a harmonic oscillator ion trap, incorporating the MPIG of FIGS. 1A and B.
Figure 4A:
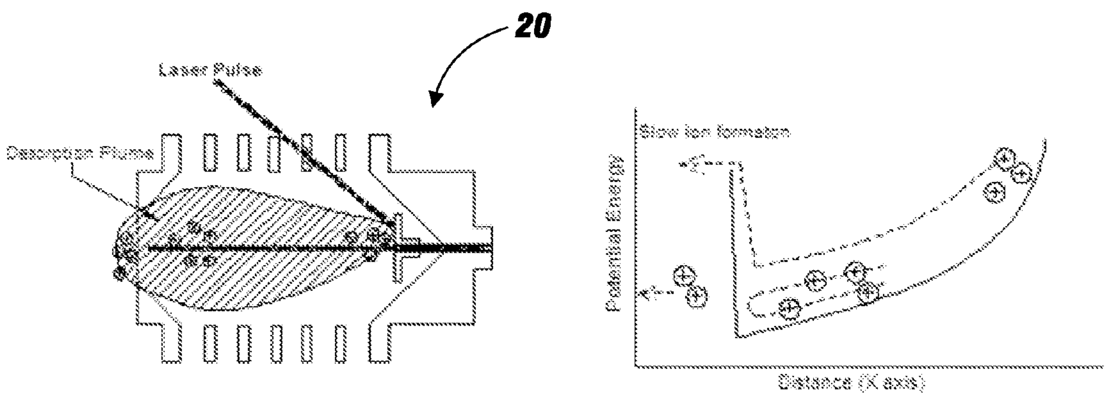
Figure 4B:
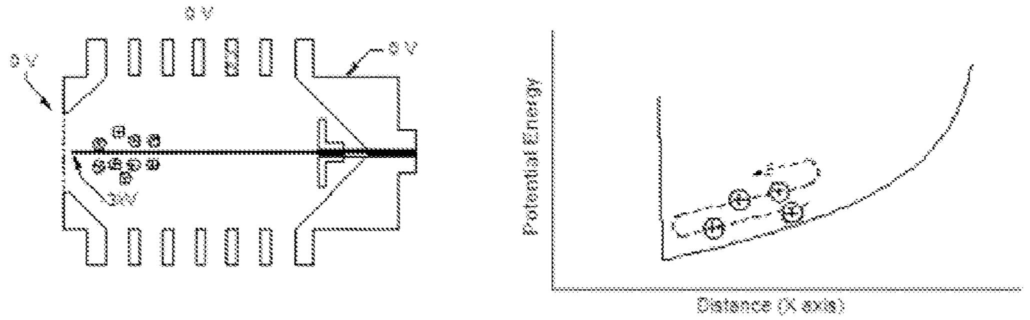
Figure 4C:
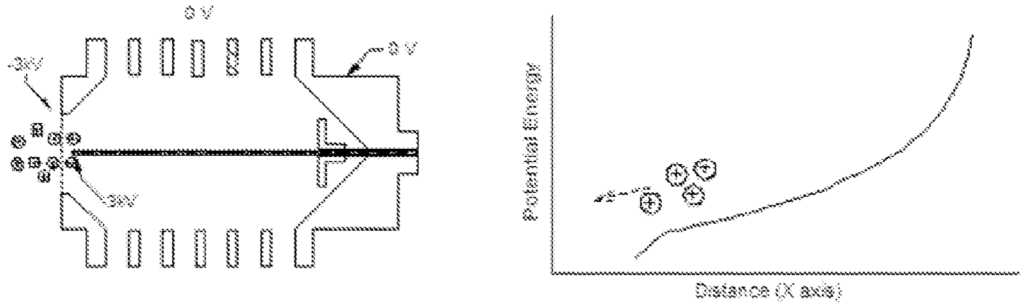

FIGS. 4A-C are diagrammatical sectional views (left side) of the single MPIG instrument of FIGS. 3A and B, and associated graphs (right side) illustrating the ability of the instrument to trap ions.

Figure 5A:
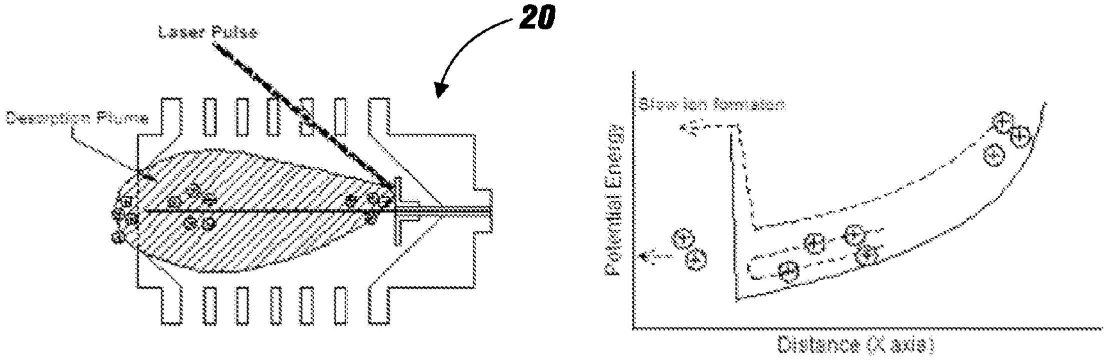
Figure 5B:
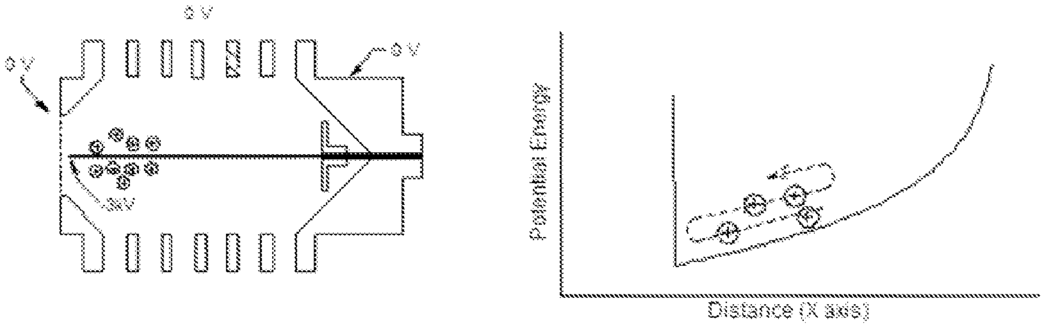
Figure 5C:
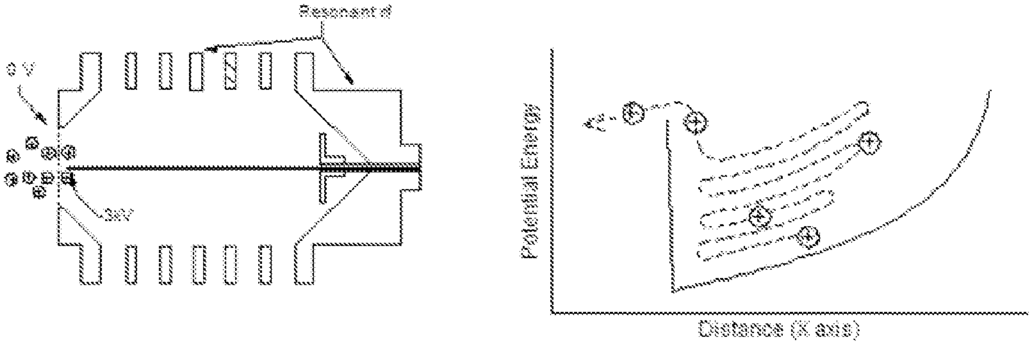

FIGS. 5A-C are diagrammatical sectional views (left side) similar to FIGS. 4A-C, and associated graphs (right side) illustrating a specific method of operation of the instrument to provide broadband detection of ions.

Figure 6A:
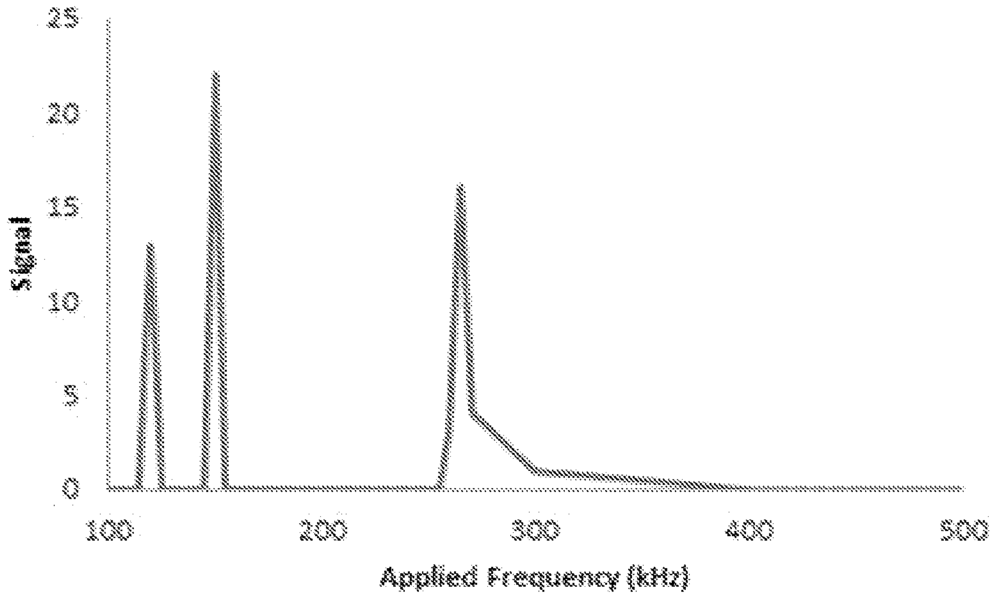
Figure 6B:
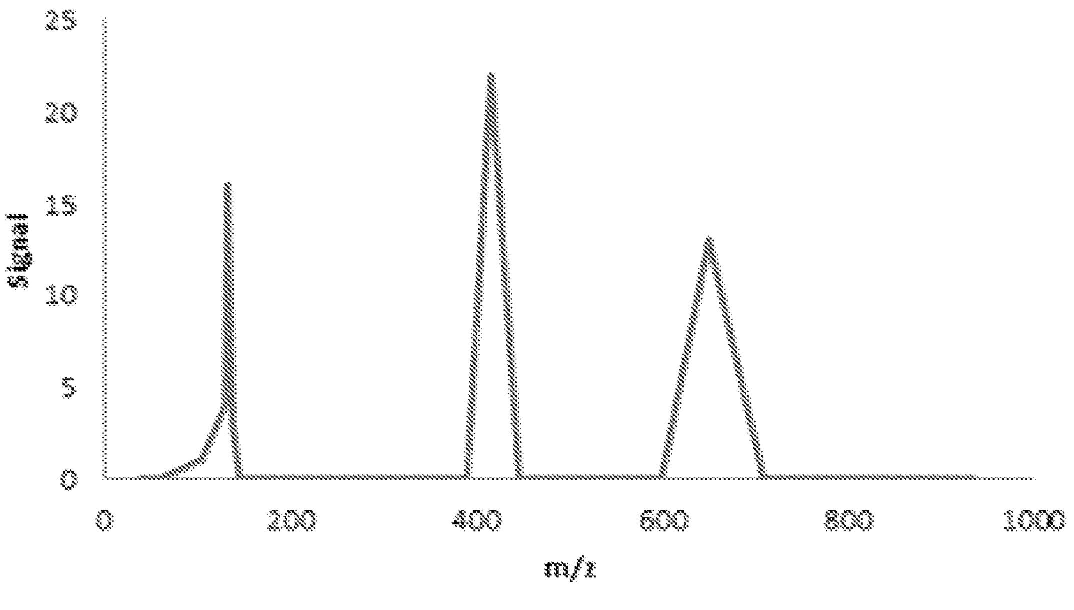

FIGS. 6A and 6B are graphs illustrating principles of operation (e.g. frequency response) of the instrument of FIGS. 1-5.

Figure 7A:
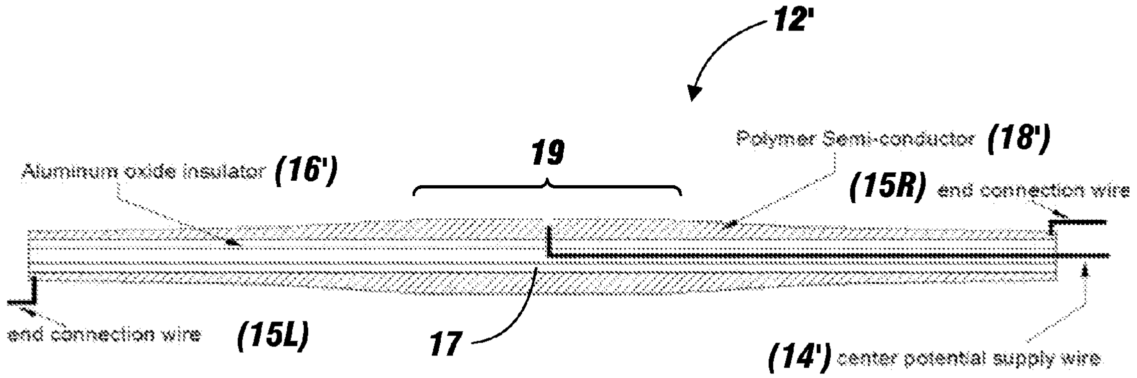

FIG. 7A is a side elevation sectional view of alternative structure of a modified MPIG according to an alternative exemplary embodiment according to the present invention.

Figure 7B:
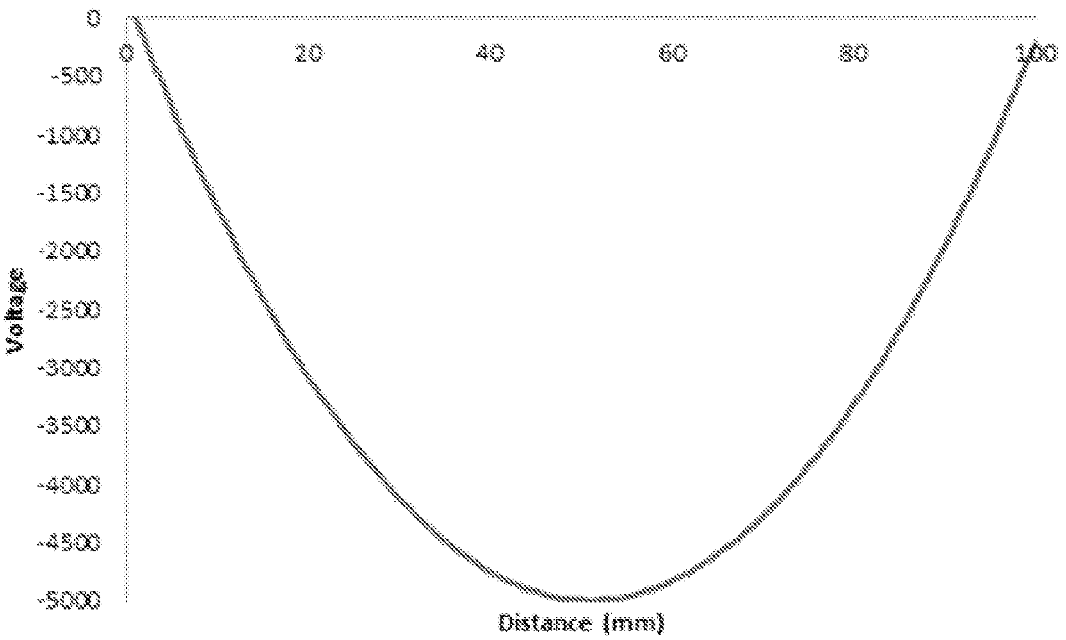

FIG. 7B is graph illustrating the voltage gradient produced by the embodiment of FIG. 7A.

Figure 8:
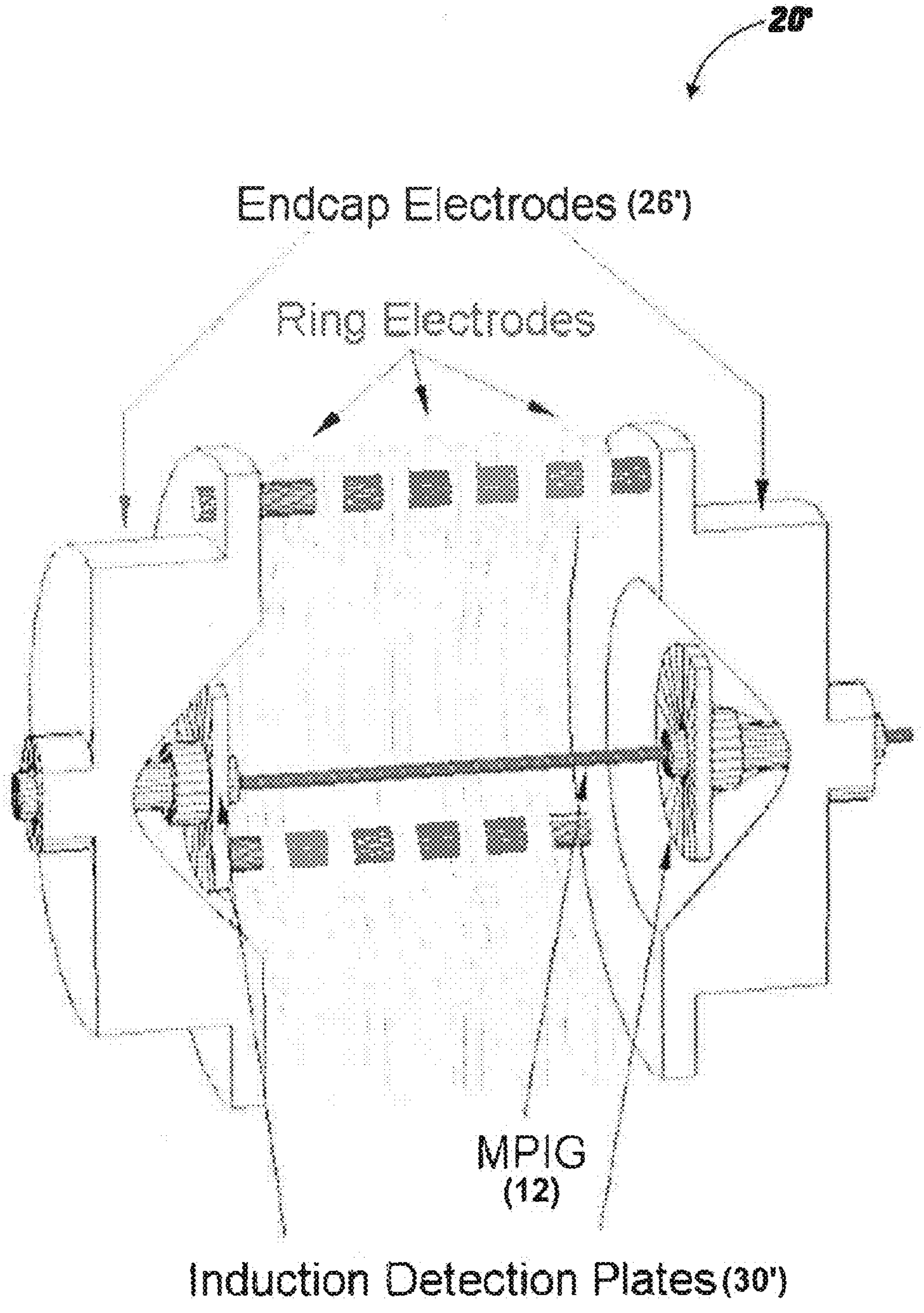

FIG. 8 is a sectioned perspective view of an alternative configuration of an analytical instrument using one of the modified MPIGs but with an inductive imaging detection set-up.

Figure 9A:
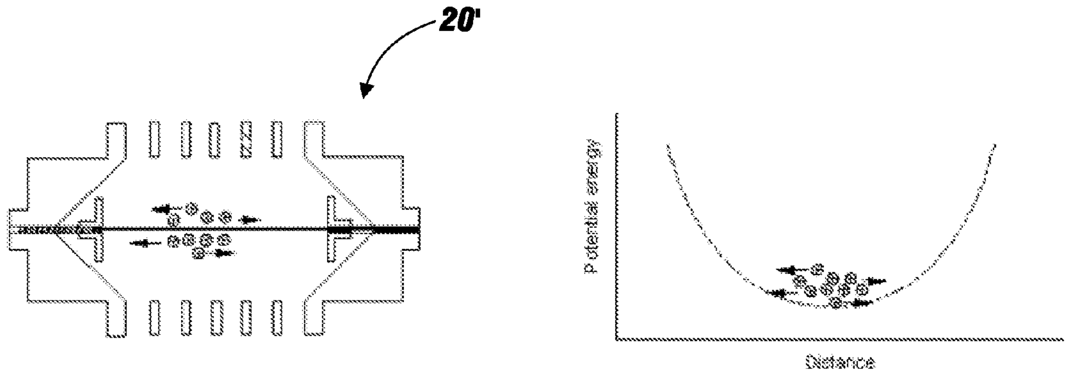
Figure 9B:
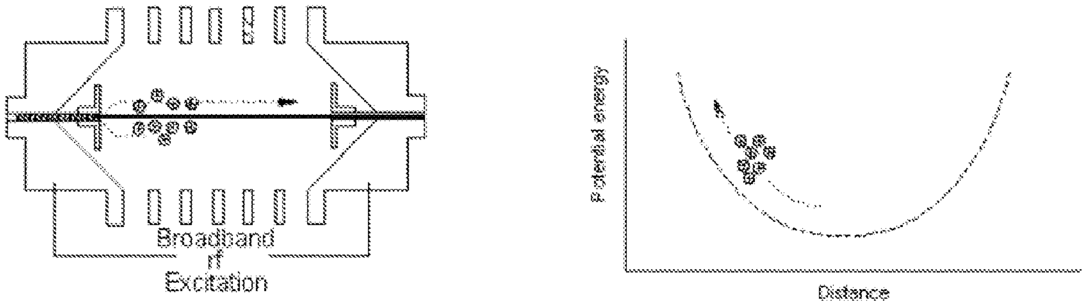
Figure 9C:
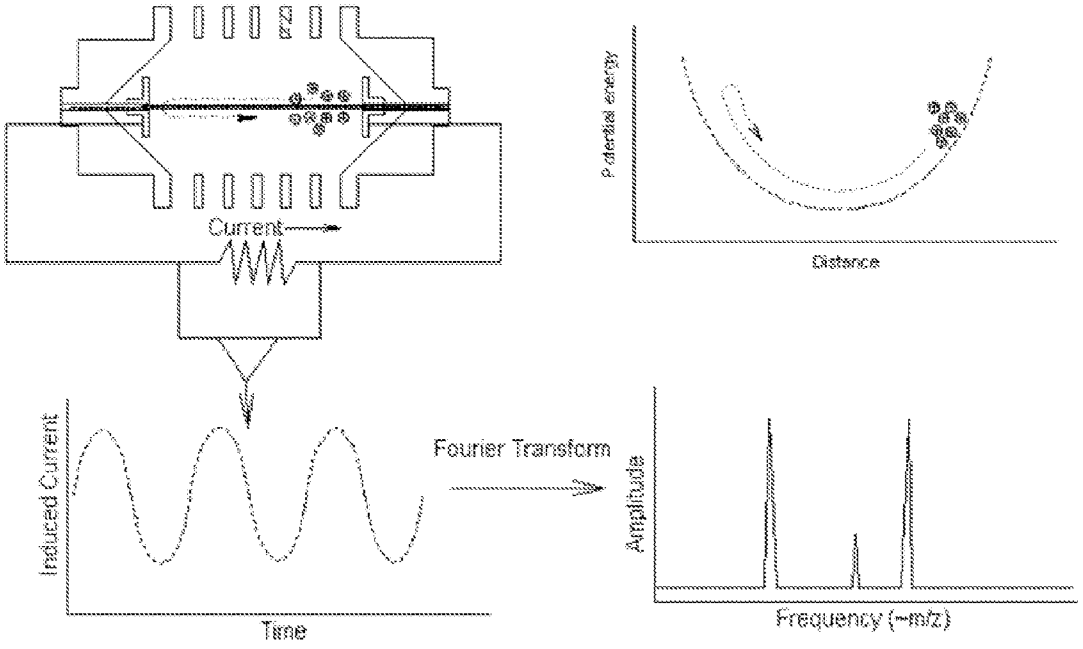

FIGS. 9A-C are diagrammatical sectional views (left side) of the single MPIG instrument of FIGS. 7A and B, and associated graphs (right side) illustrating the ability of the instrument to trap and detect ions by the inductive imaging detection set-up of FIG. 8.

FIGS. 10A-E are diagrammatical sectional views (left side) of the single MPIG instrument of FIGS. 7A and B, and associated graphs (right side) illustrating the ability of the instrument of FIG. 8 to eject unwanted ions, and trap and detect ions by inductive imaging detection.

Figure 1A:
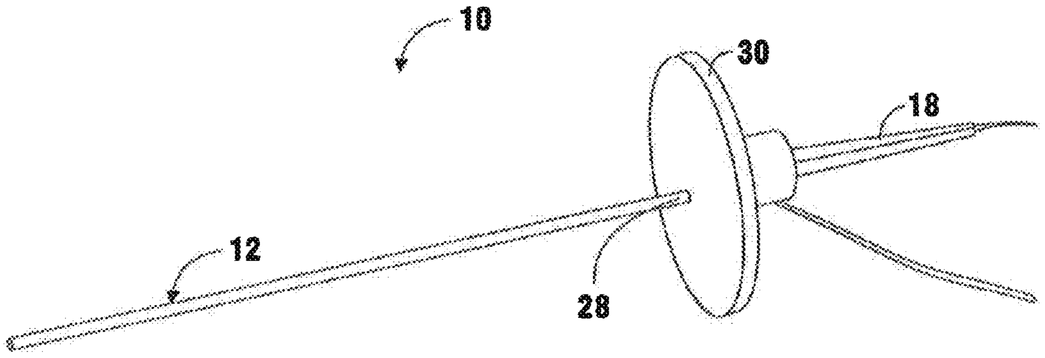
FIG. 1A is reduced-in-scale perspective view of a multi-potential ion guide (MPIG) used as the mass analyzer in an analytical instrument according to a first exemplary embodiment according to the present invention.
Figure 11A:
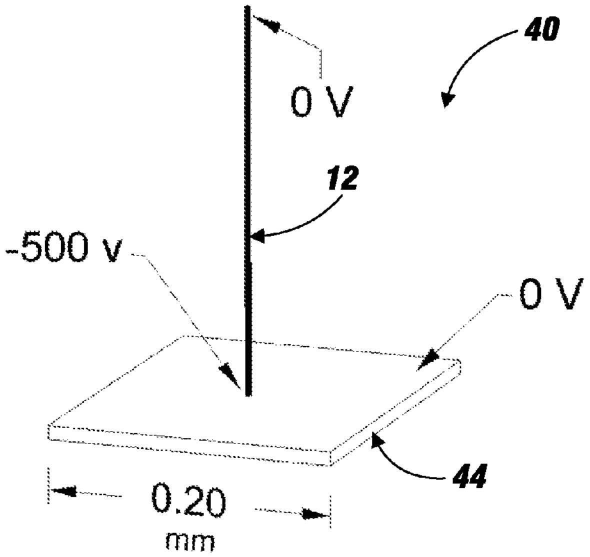

FIG. 11A is a diagrammatic illustration of a simple miniaturized ion trap using a modified MPIG of the configuration of those of FIGS. 1A and B or 7A and B according to another exemplary embodiment of the present invention.

Figure 11B:
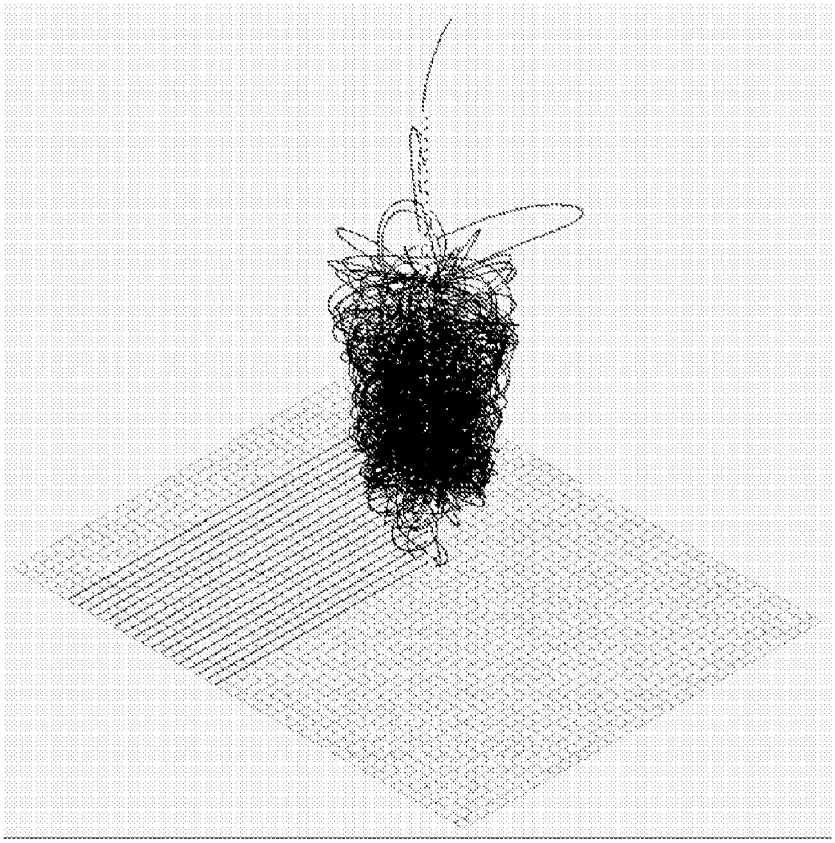

FIG. 11B is a diagrammatic simulation of ion trajectory in the trap of FIG. 11A.

Figure 12:
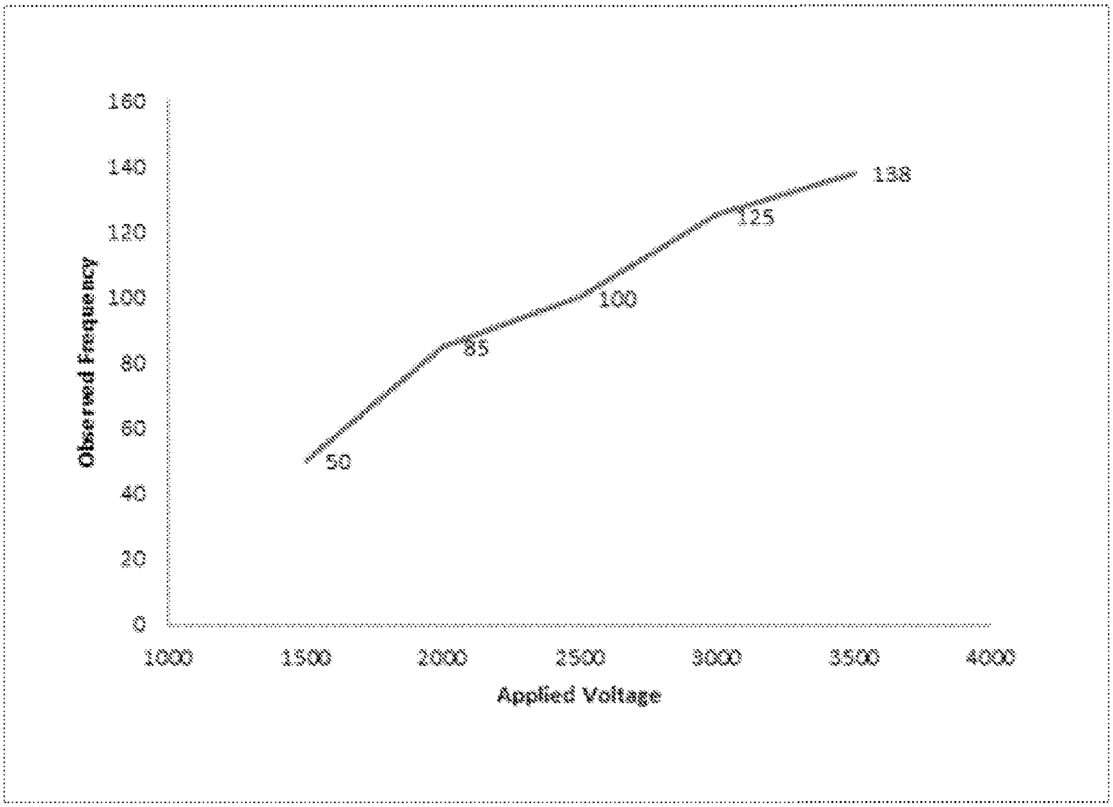

FIG. 12 is a plot related to operation of a modified MPIG such as in FIGS. 1A and B or FIGS. 7A and B.

Figure 13:
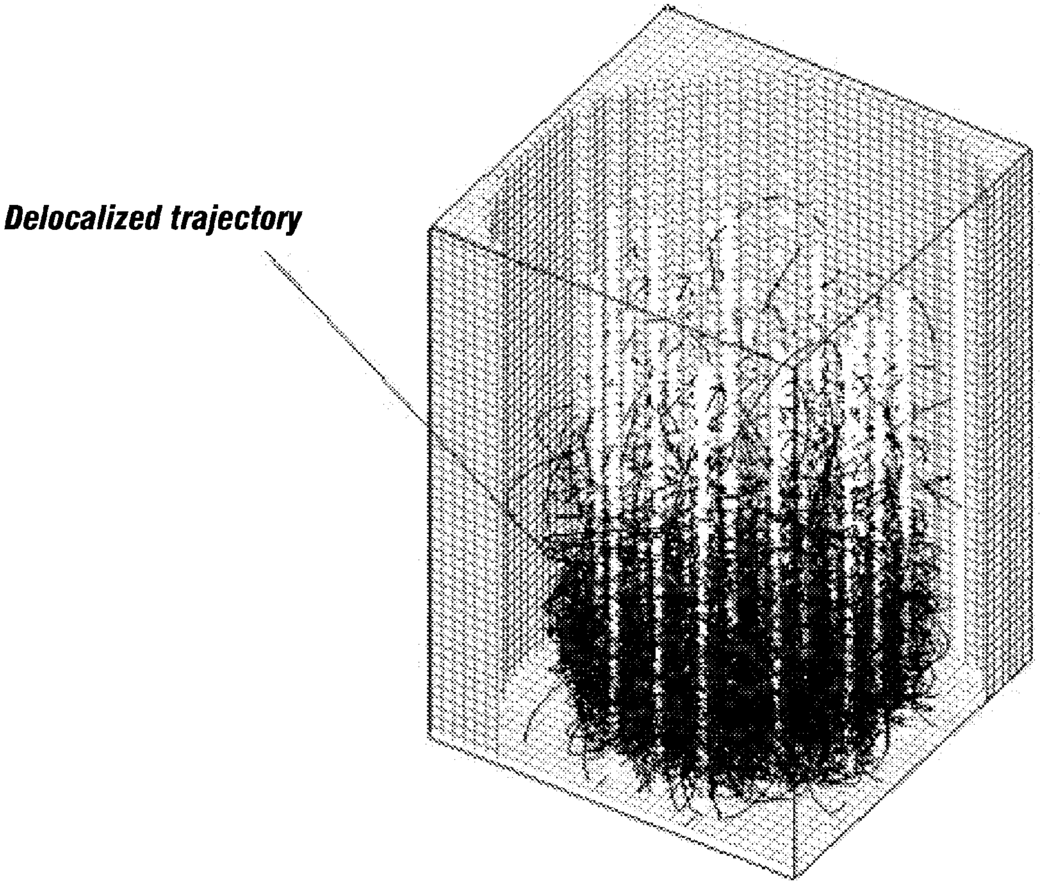

FIG. 13 is a diagrammatic depiction of ion trajectory for a plural modified MPIG array according to another exemplary embodiment of the present invention.

Figure 14:
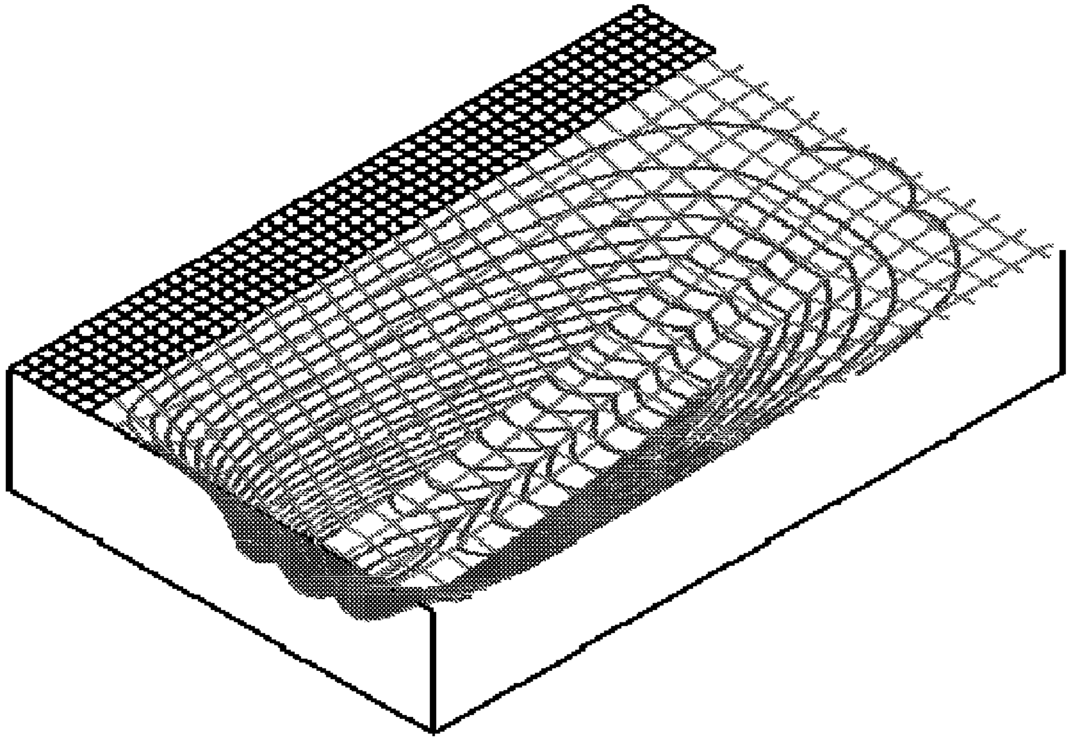

FIG. 14 is a computer generated model of a potential energy well created by the array of FIG. 13.

Figure 15A:
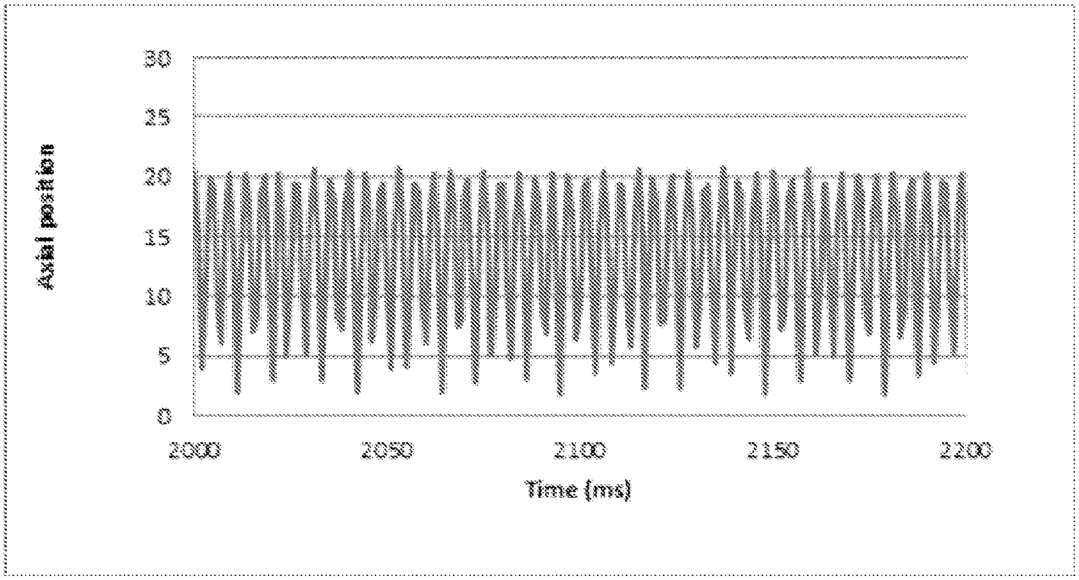
Figure 15B:
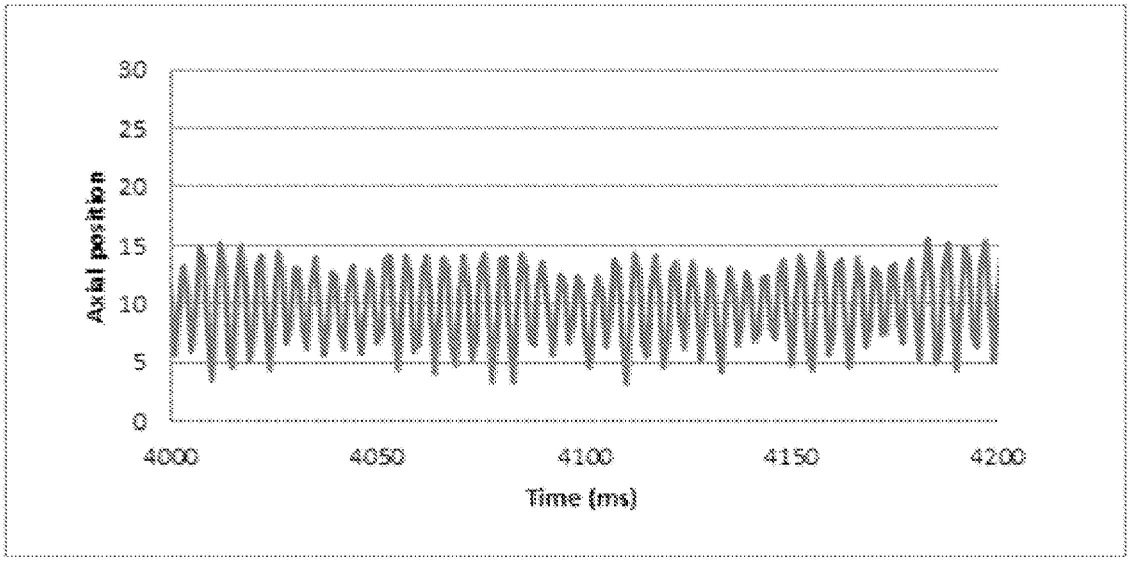

FIGS. 15A and B are plots of axial position of an ion trapped in an array analyzer of the type of FIG. 13.

Figure 16:
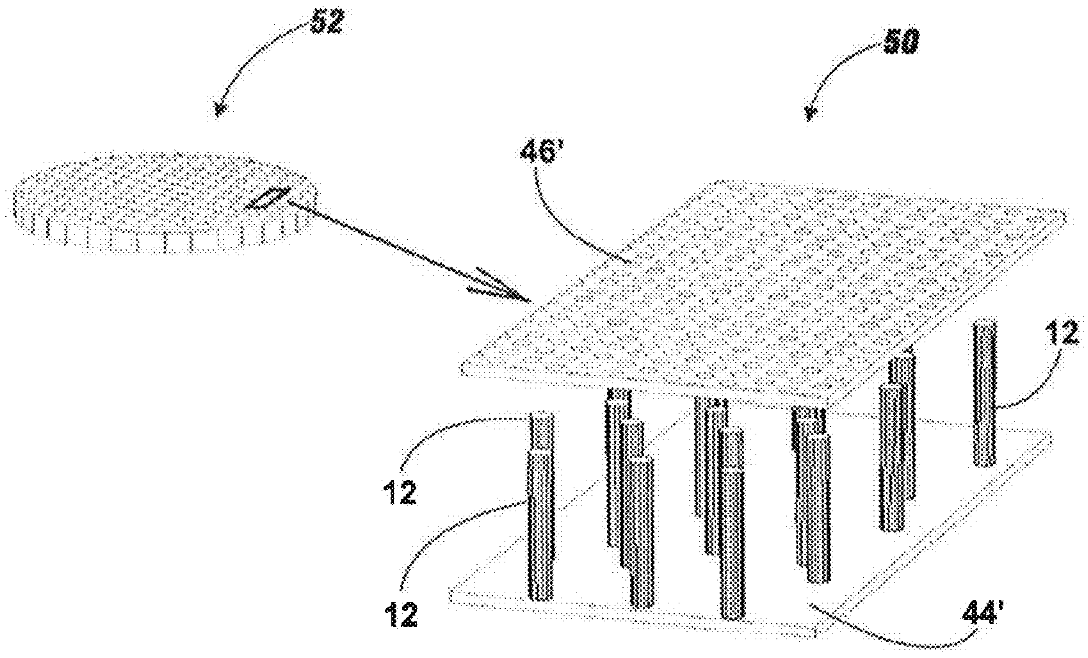

FIG. 16 is a partially exploded diagrammatic illustration of an array of plural miniaturized modified MPIGs like the one in FIG. 11A according to another exemplary embodiment of the present invention. The left-side circular member is intended to schematically illustrate that the enlarged in scale array could be a module that could be one or plural such modules combined into a larger apparatus.

Figure 17A:
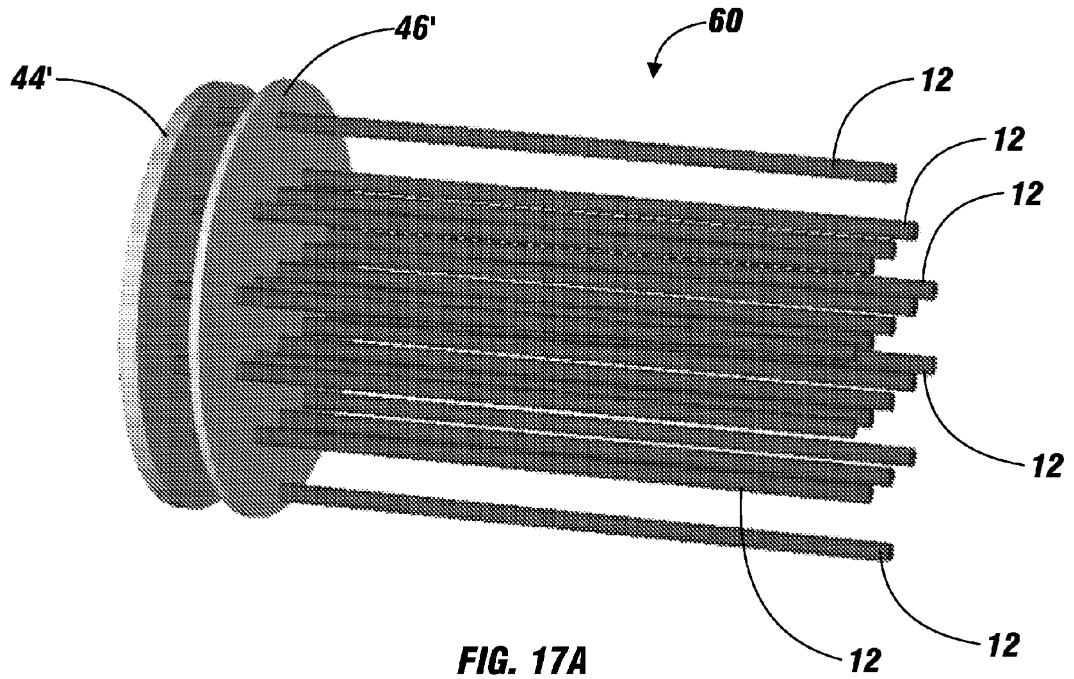

FIG. 17A is a perspective view of another configuration of a plural modified MPIG array in assembly with supply and reference electrodes.

Figure 17B:
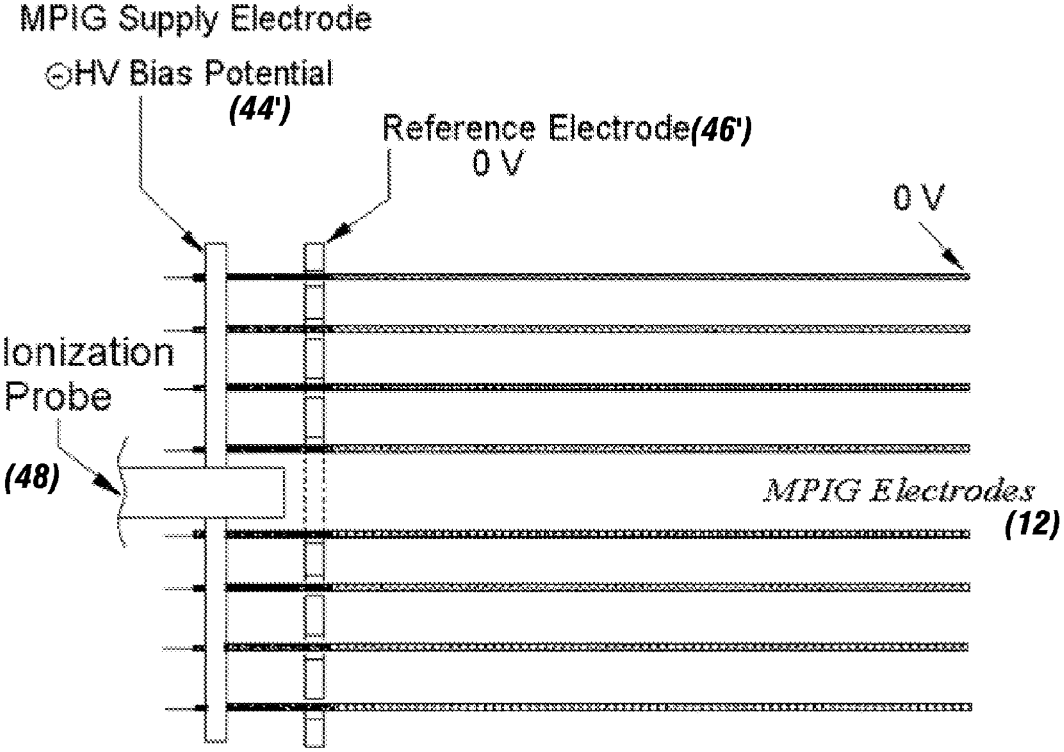

FIG. 17B is a schematic depiction of the array of FIG. 17A in section and includes an optional ionization probe.

Figure 17C:
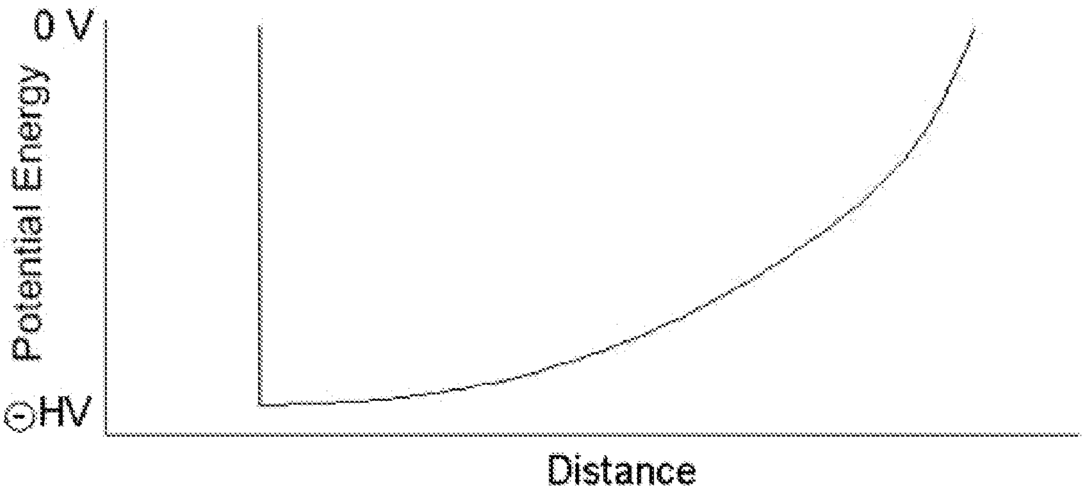

FIG. 17C is a plot of the potential energy field associated with the array of FIGS. 17A and B.

Figure 18A:
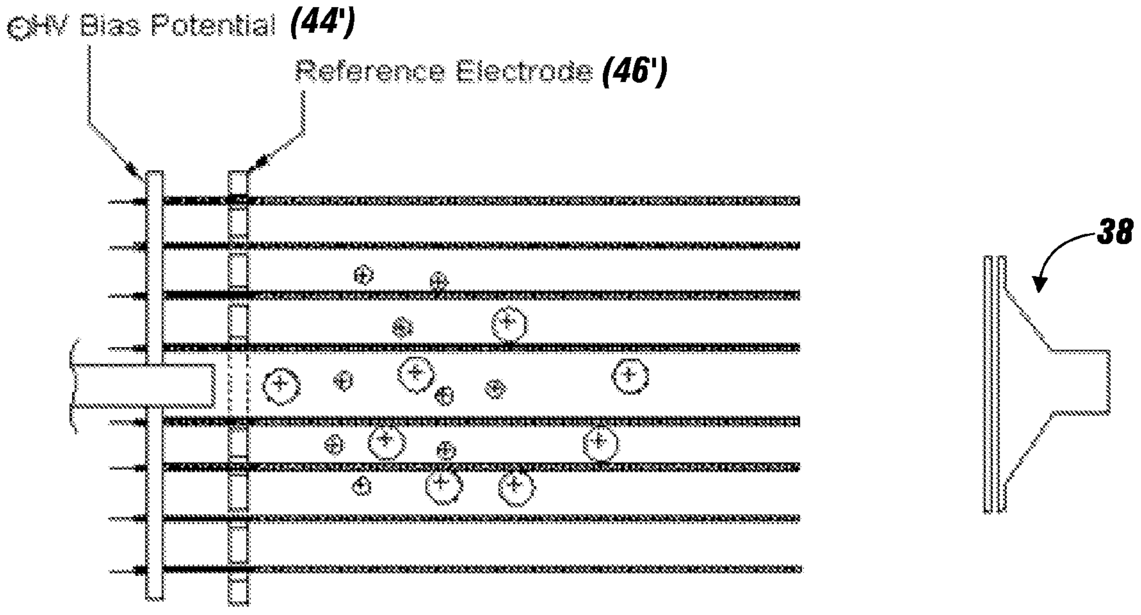
Figure 18B:
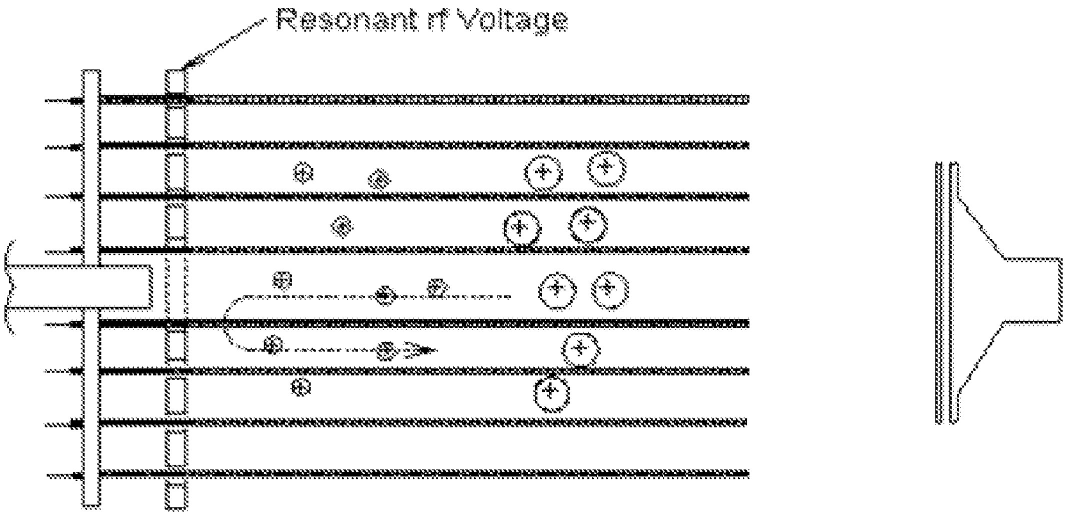
Figure 18C:
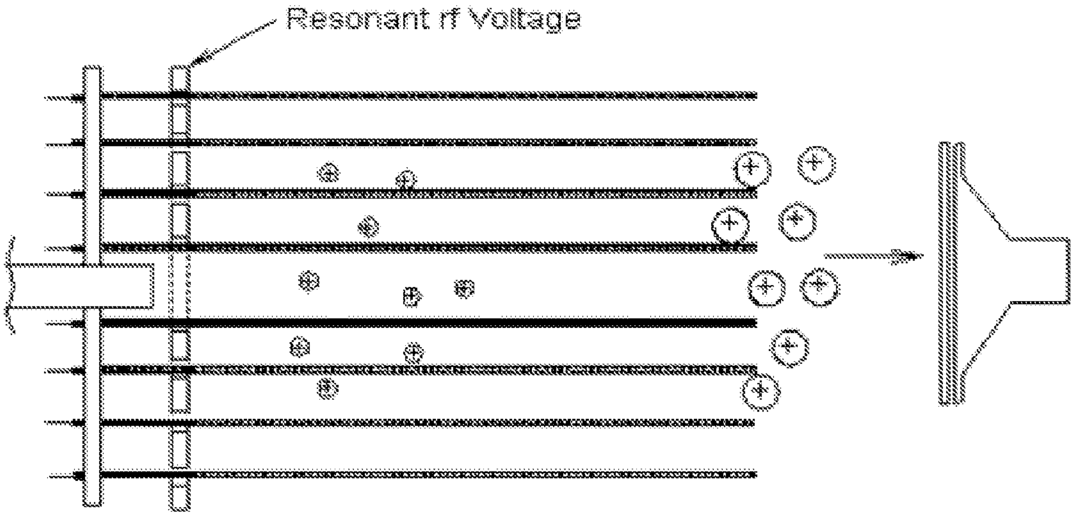

FIGS. 18A-C are schematic illustrations of ion detection by ion ejection with a plural MPIG array of the type of FIGS. 17A-C.

Figure 19A:
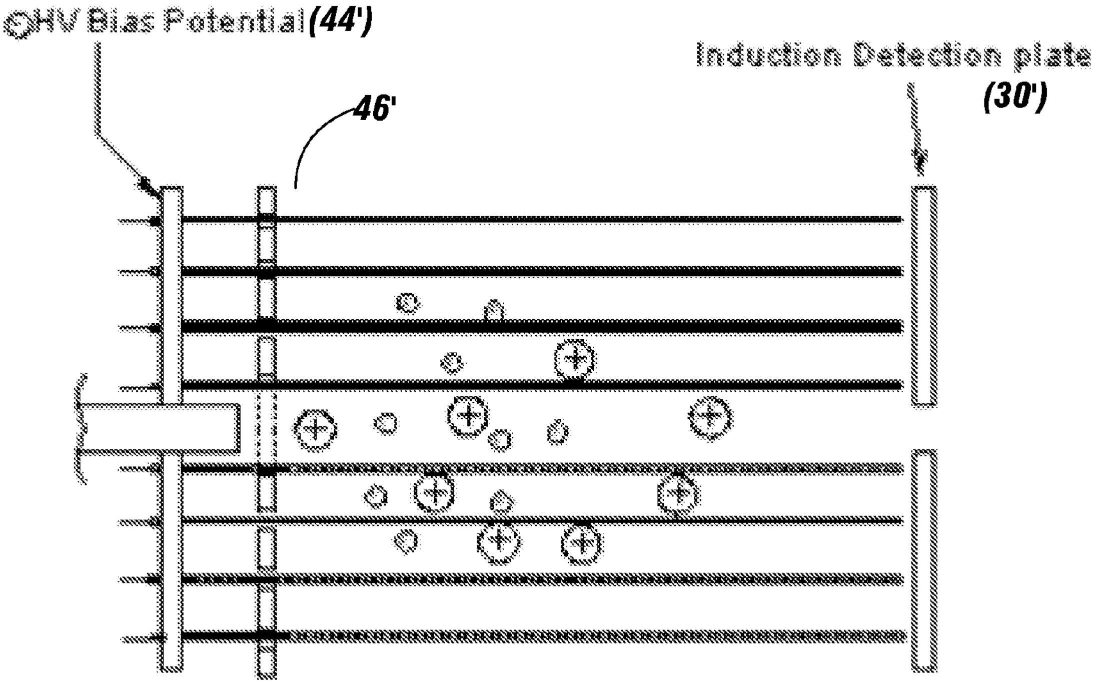
Figure 19B:
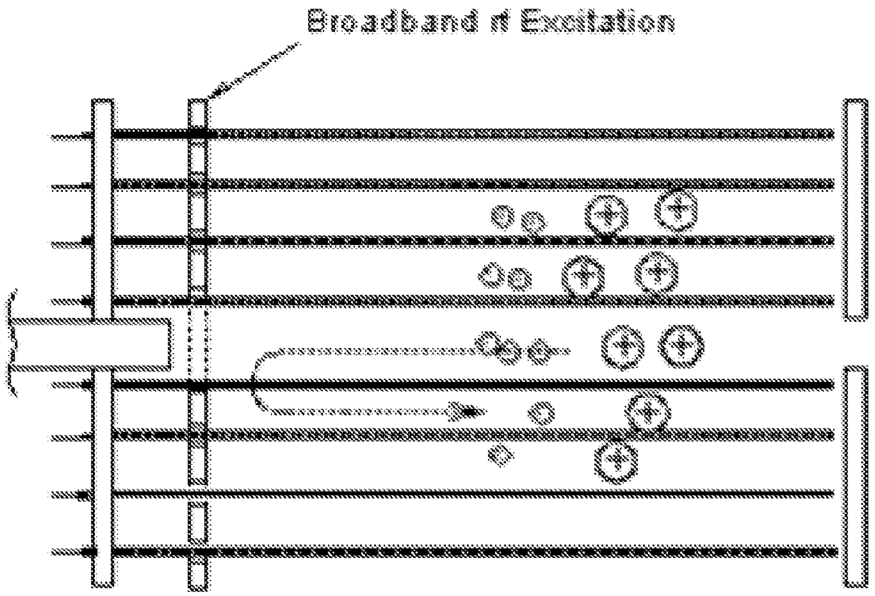
Figure 19C:
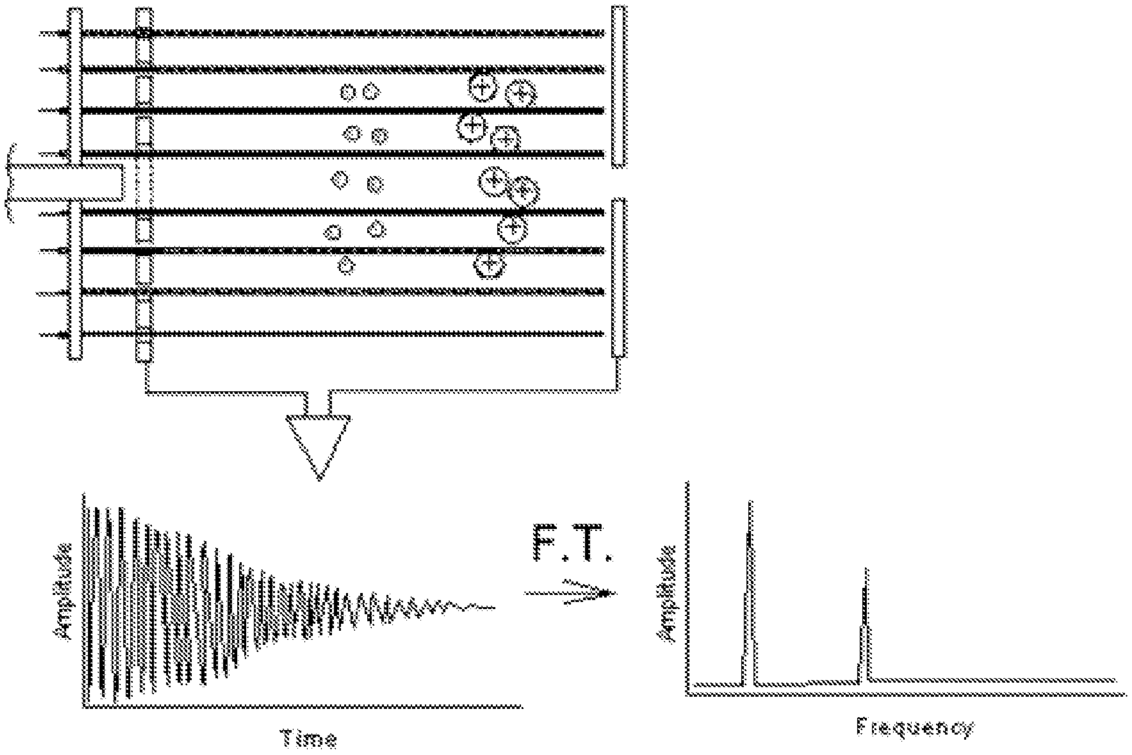

FIGS. 19A-C are schematic illustrations of inductive detection with Fourier transform analysis with a plural MPIG array of the type of FIGS. 17A-C.

IV. DETAILED DESCRIPTION OF EXEMPLARY EMBODIMENTS

A. Overview

As indicated in the Summary of the Invention, a central aspect of the present invention is the utilization of a modified Multi-potential Ion Guide (MPIG) in an ion trap device. The ability to control the resistive coating on an underlying substrate is a cost-effective and flexible way to vary the potential field of the ion guide. This leads to such benefits as cheaper mass analysis instruments, as well as the ability to produce them in a form that can be taken out of laboratory settings and into the field. It has also been discovered that improvements in ion trapping and related functions can be achieved. And, it has been discovered that an array of plural MPIGs can be used in one instrument. The ability to chemically modify each such MPIG by application of such coatings likewise makes a plural ion guide instrument cheaper to produce than use of other state of the art ion guides. It has also been discovered that use of an array of MPIGs can delocalize an ion trap over the plurality of ion guides to boost performance of the instrument.

The invention can take many forms and embodiments. But to better understand the invention, reference should be taken to the following exemplary embodiments and aspects. Discussion of proof of concepts is also included.

B. Single MPIG Examples

Disclosed here are examples of use of a single modified MPIG type electrode in an ion trap instrument. FIGS. 1-6 show the structure of a first example of a single modified MPIG (FIGS. 1A and B), its assembly into an ion trap instrument (FIGS. 2A and B), and diagrams related to its operation in the ion trap. Note particularly that this embodiment produces what is described as a partial parabola (specifically "half of a parabola"). This is illustrated in FIGS. 2, 4A-C, 5A-C, and 6A-B.

The benefits of such a combination are discussed below. One is that ion motion will oscillate back and forth in the trapping space within the modified MPIG electric field with a frequency that is proportional to the mass of the molecule. This provides a direct way to detect and differentiate mass. Coordinated operation with the other components of the ion trap (e.g. endcap grid electrode) provides an effective ion trap. This leads to use of this combination in a variety of ways including but not limited to mass separation, mass detection, mass selection, and tandem or linked tests.

Note then how a full parabola embodiment is described. This embodiment produces what is described as full parabola (specifically "an entire parabola"). This is illustrated in FIGS. 7A and B, 9A-C, and 10A-E. This improves the potential field of the modified MPIG and provides other benefits discussed below.

The key to my method of mass analysis is the use of a multi-potential ion guide (MPIG). The MPIG is a single strand ion guide that creates a varying potential field by using user controlled resistive coating as the electrode surface. By varying the conductivity of the surface of the electrode, it is possible to use the single electrode as a voltage dividing device which alters the potential field generated by the ion guide at different locations. This electrode can be used to create any potential surface desired at the center of the spectrometer near the ions flight region. This is in contrast to more common approaches which use multiple external electrodes that attempt to control the ion flight and therefore mass analysis.

Figure 1B:
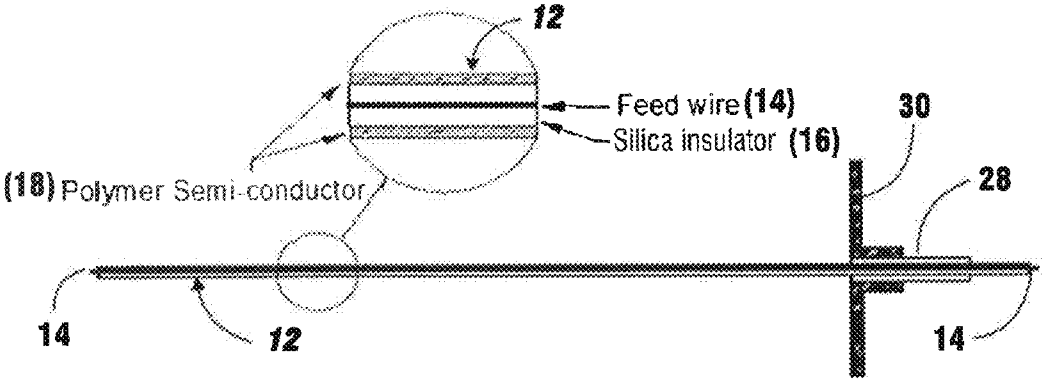
FIG. 1B is a side elevation sectional view of the MPIG of FIG. 1A with an enlarged view of a portion of the MPIG for clarity.

Diagrams of the electrode assembly 10 are shown in FIGS. 1A and 1B. In one example, a 1 mm aluminum oxide insulator 16 was coated with a combination of a silver doped conductive polymer and a resistive polymer coating 18 to create regions of conductivity as well as discrete resistance along the electrode 12 surface. The polymer coatings 18 were acquired from METCH Electronic Materials Technology and provided resistances in the mega ohm range. See U.S. Pat. No. 6,657,190 regarding construction of the electrode. Other configurations of coating 18 for achieving a desired potential field according to the invention are, of course, possible.

FIGS. 1A and 1B thus illustrate one example of the basic structure of a modified Multi-potential ion guide (MPIG) type electrode assembly that can be used as the mass analyzer in an analytical instrument such as shown at FIGS. 2A and 2B. Electrode assembly 10 includes a feed wire 14 along the longitudinal axis of the silica insulator 16; as well as an insulator sleeve 28 that allows mounting of electrode 12 in a plate 30 (e.g. can be conductive and used as an ion repeller or otherwise as is known in the art).

When a voltage difference is placed between the two ends of the electrode 12, a potential gradient defined by the resistance will be created. In this manner, a single electrode 12 can be used in a constantly changing field by changing the resistivity of the surface to alter the resultant voltage.

Figure 2:
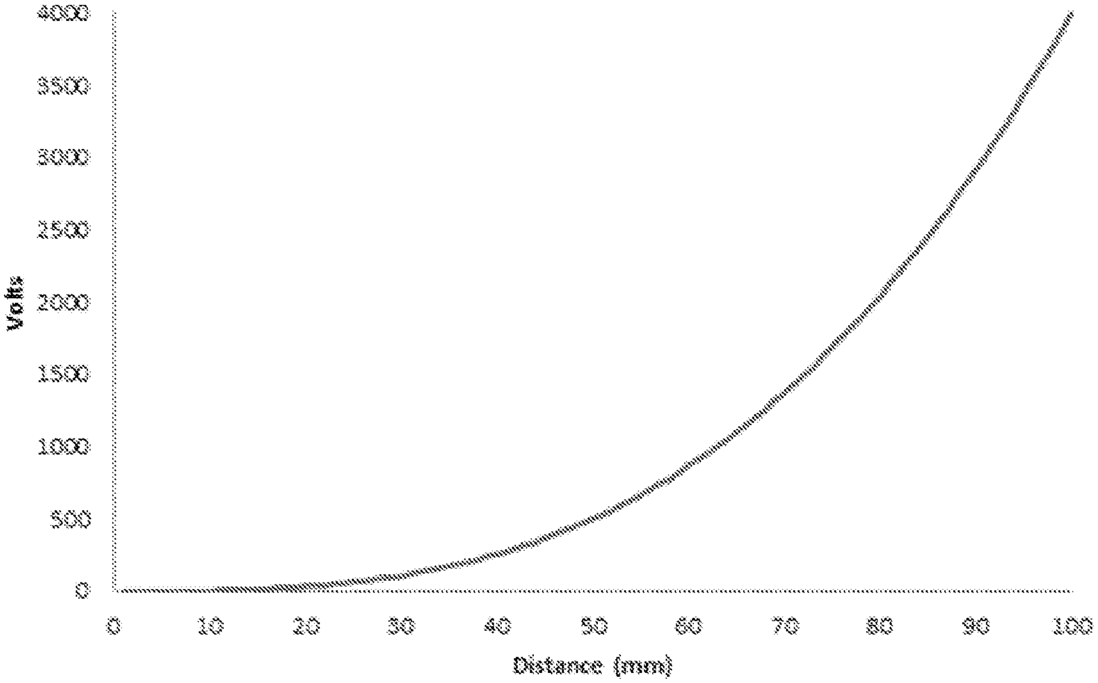
FIG. 2 is a graph illustrating electric potential generated by the semiconductor surface of the MPIG of FIGS. 1A and B in one embodiment and use.

FIG. 2 is a graph illustrating electric potential generated by the semiconductor surface 18 of the MPIG 12. Note how it has a partial parabolic shape.

Shown in FIG. 2 is the variable resistance of the electrode 12 that is used to create a parabolic field gradient. Varying the thickness of a semiconductor coating controls the resistance of the surface 18 resulting in a voltage gradient. This shape of field gradient creates harmonic oscillations of ions that are attracted to the resultant electric fields. In order to mimic a harmonic oscillator, the MPIG 12 was created as half of a parabola. Using an end cap electrode 30 as an electrostatic mirror, ions trapped in the resultant field are reflected back up the field generated by the MPIG 12 creating the effect of being trapped in a potential well. Harmonic oscillations are created by a system that constantly produces a force that is proportional to the location within the system. This kind of proportional force results in ion motion that will oscillate back and forth within the electric field with a frequency that is proportional to the mass of the molecule.

Figure 3B:
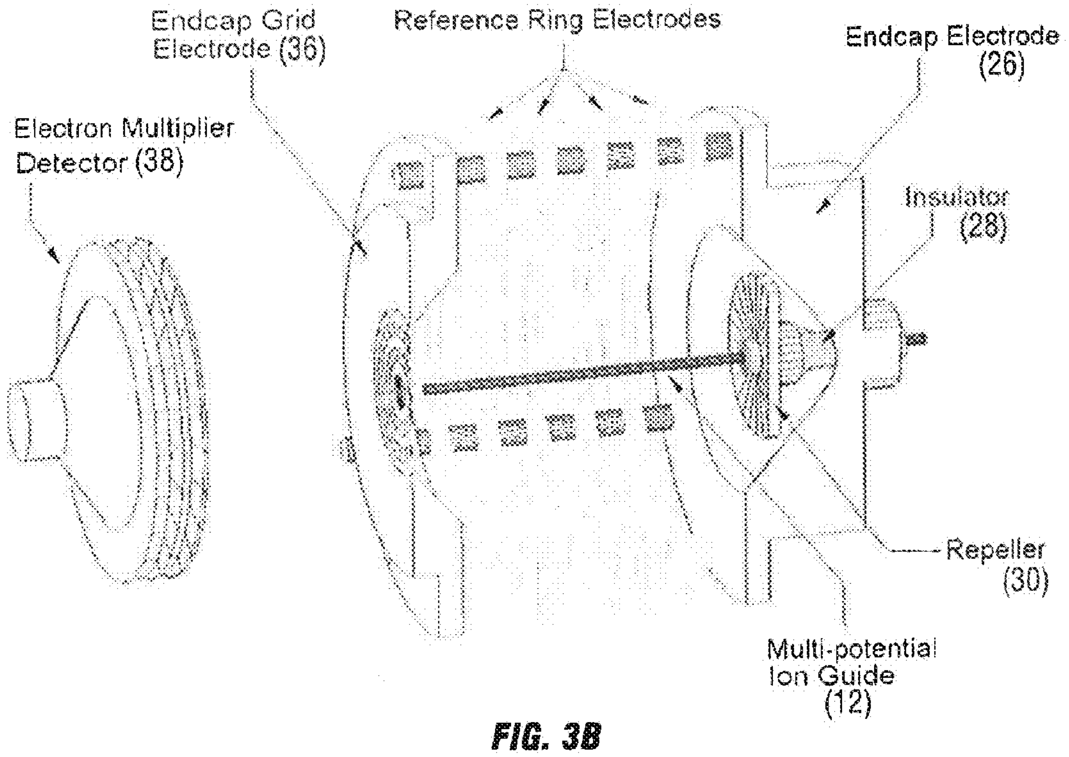
FIG. 3B is a partially exploded, partial sectional illustration illustrating the interior structure of the instrument of FIG. 3A, including the MPIG of FIGS. 1A-B.

In order for the electrode 12 to produce the desired field, additional electrodes are used to generate the needed field lines. A diagram of the complete analyzer instrument 20 containing the MPIG assembly 10 is shown in FIG. 3.

FIG. 3A illustrates how analytical chamber portion 22 of analyzer 20 can be connected at one end to a mounting plate 24 to allow analyzer 20 to be anchored or attached to other components. Analyzer 20 essentially constitutes a harmonic oscillator ion trap incorporating the MPIG 12.

Ion trajectories within this harmonic oscillator trap were studied theoretically using the ion trajectory simulation program SIMION (available from Scientific Information Services, Inc., 1027 Old York Road, Ringoes, N.J. 08551-1054. USA; see also www.simion.com including documentation for the program. These trajectory studies demonstrated a simple relationship between mass (mass to charge ratio) and frequency of oscillation along the axis of the MPIG.

$$\text{Oscilation Frequency} = \frac{k}{\sqrt{\text{mass of molecule}}}$$

Where k is a proportionality constant dependent upon the shape of the electric field generated by the MPIG.

A test of the analyzer 20 was accomplished using Cesium Iodide. Cesium Iodide is a standard calibrant used because of its ability to produce cluster ions at repeatable intervals. In this experiment, Cesium ions were desorbed in the analyzer cavity using laser desorption methods (well known in the art). Initially, the ability of the system 20 to trap ions was studied by holding the potential on the end cap grid electrode 36 at a high potential. The potential on the grid electrode 36 kept the ions from leaving the potential field generated by the MPIG 12, thus trapping them within the cavity of the analyzer 20. Following a variable delay, the potential on the grid 36 was dropped and the ions exited the trap and were accelerated into the electron multiplier detector 38, generating a signal. This process is illustrated in FIGS. 4A-C. Through this approach the ability of the system 20 to effectively trap ions was verified.

FIGS. 4A-C illustrate the following: A) Ions are produced by laser desorption of CsI located on the probe 12. Ion formation occurs over a large area within the trap. Ions formed either too prompt or too slow are not trapped in the cell 22. Only ions formed within the low potential energy region of the ion trap are effectively trapped in the potential well. B) trapped ions are allowed to resonant within the field for periods ranging from 2-500 ms. C) the voltage on the grid electrode 36 is dropped and the ions are accelerated from the trap into the detector 38.

Because the oscillatory frequency of each mass is unique, mass determination is accomplished by monitoring an ion's response to an applied rf field. This detection can be achieved by several different methods.

The simplest approach to ion detection in the proposed cell is through the use of an electron multiplier located outside the boundaries of the potential well (FIG. 3). If an rf field is applied to the trap plates it will accelerate any ions of that mass. If any ions of that mass are present in the trap they will be accelerated and escape the trap striking the electron multiplier and thereby creating a signal. If no ions of that mass are present in the cell, no signal will be generated. By sweeping a range of rf frequencies using an rf sweep generator, signals will be detected at the frequencies where ions trapped in the cell come into resonance thus permitting broadband detection. This process is demonstrated in FIG. 5.

FIG. 5 diagrammatically illustrates ions that are formed in the low potential energy region of the trap are stored for periods ranging from 2-500 ms. When a resonant electric field is superimposed on the repeller endcap, ions are accelerated by the resonant field, exit the analyzer, and are detected by the electron multiplier detector.

The results of the ion signal as a function of the frequency of the applied electric field are shown in FIG. 6. FIG. 6 is essentially showing frequency response of what is called here a harmonic oscillator ion trap.

As seen in FIG. 6, signals were generated as a function of the resonant oscillating electric field applied at 260, 150 and 115 kHz which correspond to the expected calibration ions having masses of 133 amu ($Cs^+$), 393 amu (Cs(CsI)) and 653 amu ($Cs(CsI)_2$). This data clearly illustrates the ability of a modified multi-potential electrode 12 to act as a mass analyzer.

FIG. 12 is a plot of the observed frequency of the ion motion (kHz) as a function of the voltage applied to the MPIG electrode This initial system was then used to study the oscillatory frequency of the ion motion as a function of the voltage applied to the MPIG. As seen in the FIG. 5, the observed oscillatory frequency of the $Cs^+$ ions (m/z 133) increases as the square root of the voltage applied to the MPIG. This is consistent with theoretical ion trajectories studied using the ion trajectory simulation program SIMION. These studies demonstrated a simple relationship between mass (mass to charge ratio) and frequency of oscillation along the axis of the MPIG where k is a proportionality constant dependent upon the shape of the electric field generated by the MPIG.

Perturbations in field lines at the junction between the modified MPIG 12 and the endcap grid electrode 36 may cause limitations to both the resolution and trapping efficiency. As shown in FIG. 2, the original MPIG embodiment was created as half of a parabola. This initial design was used to permit effective evaluation of the operation of the system and demonstrate function. Use of the endcap grid electrode 36 as an electrostatic mirror created the effect of an ion being trapped in a parabolic well. However, variations in the field lines at the junction between the MPIG 12 and the end cap 36 distort the periodic motions of the ions to a small extent. These distortions can produce variations in the oscillatory frequency and may result in a loss of resolution and trapping efficiency.

This limitation can be addressed by creating an MPIG that creates the entire parabolic field, eliminating the need for an electrostatic mirror. The cross sectional design of this alternative MPIG 12 is shown in FIG. 7A.

FIG. 7A is a schematic diagram of the cross section of the proposed MPIG 12'. FIG. 7B is a diagram illustrating the resultant voltage gradient produced by varying the thickness of the semiconductor polymer 18'.

As shown in FIG. 7A, the center of the MPIG 12' will be tapped with a supply wire 14' to feed the voltage to the center 19 of the electrode 12'. The rest of the circuit is completed by connections 15L and 15R to the ends of the MPIG 12'. The voltage supplied to the center 19 of the electrode 12' is divided by the resistance of the semiconductor 18' resulting in the voltage gradient shown in FIG. 7B. Similar to the original MPIG 12, the thickness of the semiconductor 18' will be varied to produce the desired potential gradient. By creating the complete parabolic potential field, inhomogeneities of the initial design 12 may be eliminated improving the resolution and trapping efficiency of the instrument 20.

In addition to improving the potential field of the analyzer, the complete parabolic electrode 12' also is compatible with alternate methods of ion detection. By allowing the ions to move freely between trapping plates 26' at opposite ends of MPIG 12', their oscillatory frequency can be measured by detecting an induced image in the trapping plates 26'. The detected current is generated by the coherent motion of a packet of ions as it moves between the opposing plates 26'. This type of detection eliminates the need for the electron multiplier detector further reducing the size requirements of the instrument. A diagram of an instrument 20' is shown in FIG. 8, a cutaway view of a harmonic oscillator ion trap using inductive plate detection.

This induced image current can be amplified by a high impedance differential amplifier to produce a detectable frequency using a standard oscilloscope or an analog-to-digital (A-D) converter. When ions of only one mass are driven into coherence, a single frequency corresponding to that m/z will be detected. If a range of rf frequencies are applied, such that ions of all masses are driven into coherence (but not ejected), then the detected signal will be a complex mixture of the sum of the individual frequencies. This complex mixture can be deconvoluted using a Fourier or Hadamard transform into the individual frequency components. This process is illustrated in FIGS. 9A-C. FIG. 9A diagrammatically illustrates ions formed and trapped within the analyzer chamber with initially random velocity vectors will exhibit random phases of the periodic motions. FIG. 9B illustrates application of an rf excitation of all frequencies across the endcap electrodes 26' gives the ions energy and induces coherence of their periodic motion. FIG. 9C illustrates the rf electric field is turned off and the ions continue to move with their natural periodic motion, inducing an image current in the detection plates of the analyzer.

Using this method it is possible to simultaneously detect the frequencies of all ions trapped in the cell and produce a mass spectrum. The performance characteristics of the mass analyzer are greatly enhanced by using Fourier transform data analysis (well known in the art). Because ion detection is based on a digitized frequency instead of a detector response, mass resolution is based on time of observation. This results in both an improvement in signal to noise ratio as well as resolution.

In addition to the inherent advantages of Fourier analysis on the induced image current, this approach also permits tandem mass spectrometry experiments.

Figure 10A:
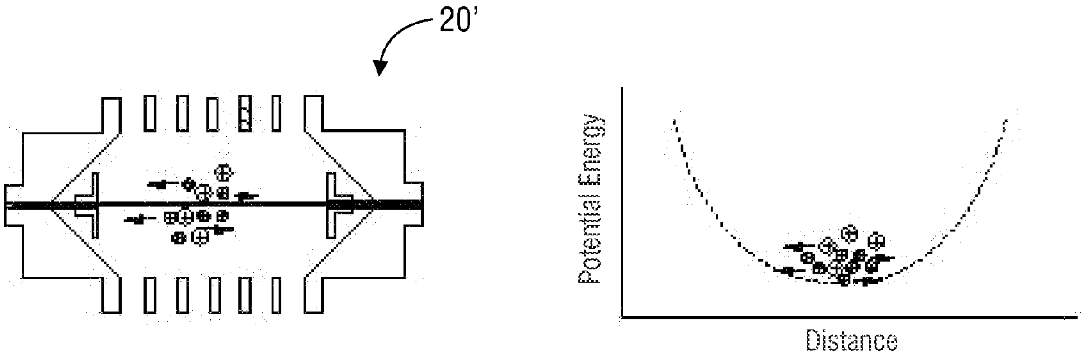
Figure 10B:
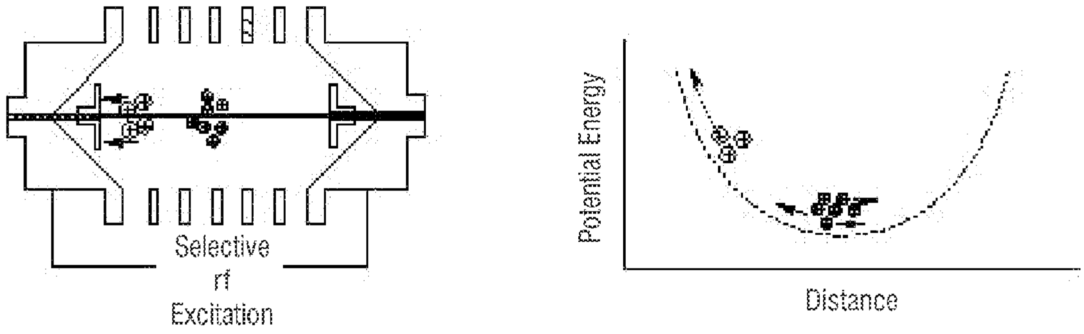
Figure 10C:
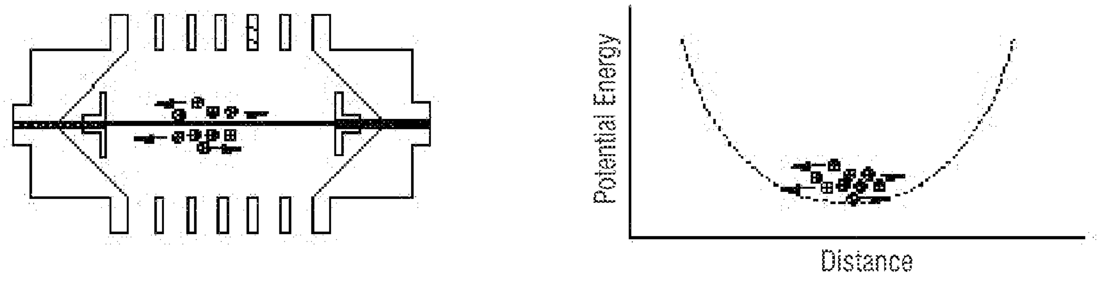
Figure 10D:
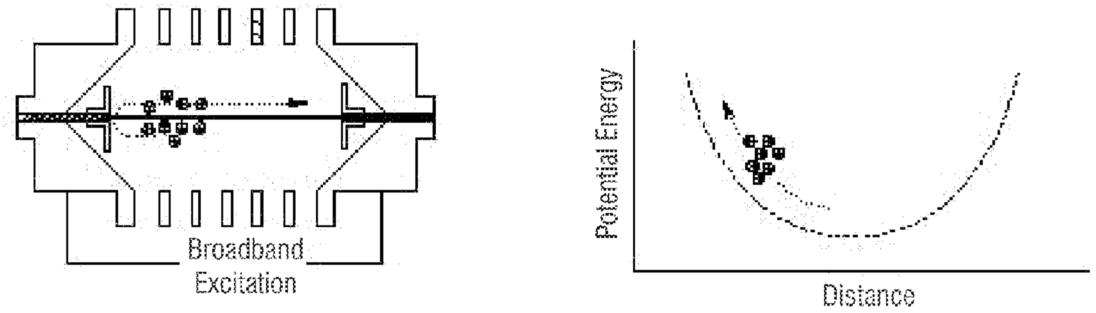
Figure 10E:
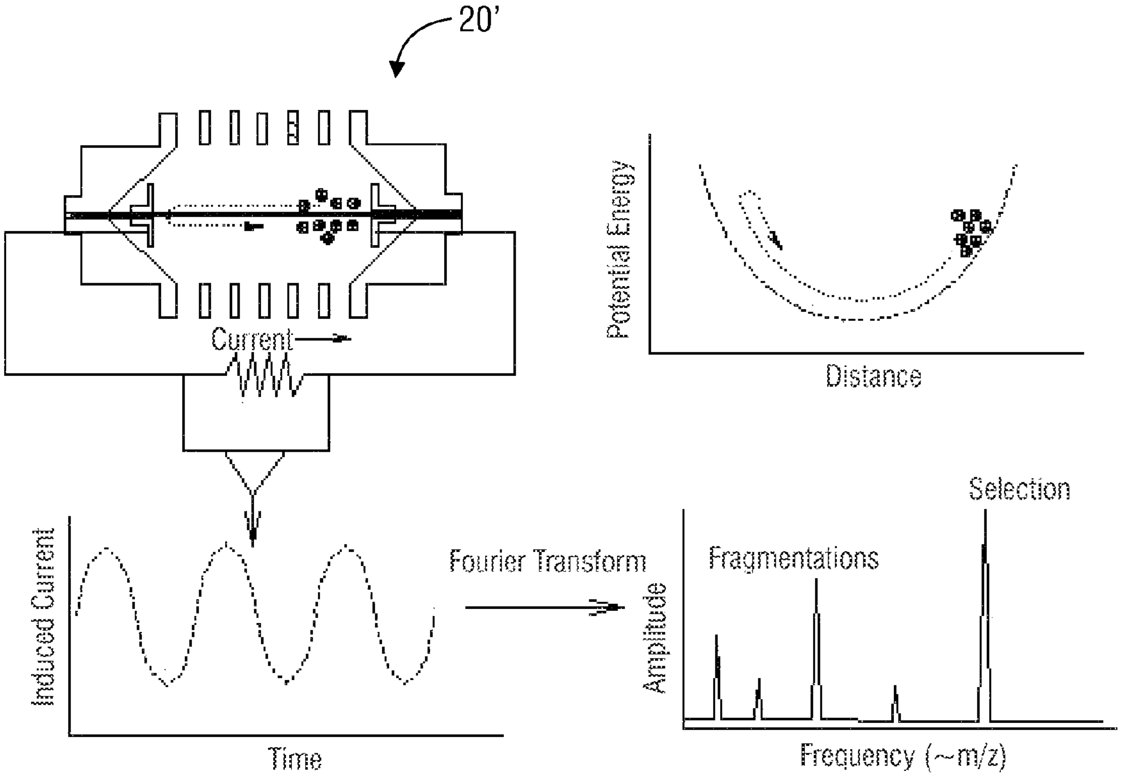

FIG. 10A diagrammatically illustrates a mixture of ions are trapped within the analyzer chamber. FIG. 10B shows resonant excitation of unwanted ions accelerates them beyond the boundaries of the analyzer chamber. FIG. 10C depicts isolated ions of interest are trapped within the analyzer chamber for chemical study. FIG. 10D indicates how the selected ions are driven into coherence by rf electric field excitation and FIG. 10E, how they are detected using the inductance detection plates.

Tandem mass spectrometry, or linked scans allows mixtures of compounds to be separated into their individual components by selecting a specific compound for study. The selected ion can then be analyzed for structural identification by several different processes, such as photo-dissociation or collision induced dissociation. Typically, this type of analysis requires two complete instruments that are connected by an interface. In Fourier transform instruments, the separation and analysis is separated in time rather than space allowing greater flexibility in structural elucidation studies. Illustrated in FIGS. 10A-E is an example of a simple MS-MS experiment. The ability to eliminate unwanted ions from the analyzer has already been demonstrated by the data shown in FIGS. 6A-B. These peaks observed in those spectra were generated by the rf ejection of selected ions using resonant electric field excitation. Using this proven technique, ions of interest can be selected within the analyzer for chemical and structural study. Because the analysis is separated in time, multiple experiments can be conducted on the sample ion. The potential for continuing studies in time on trapped ions is referred to as $MS^n$ and is possible only in a few select research grade mass analyzers.

Unlike presently available mass spectrometers which are constructed by machining complex shapes to create the required field lines, the electric fields generated by the MPIG are created by chemical modification of an insulator. Using the advances in nano-science and nano-chemistry, the process of chemical modification at the micro scale is a well-developed technique and known to those skilled in the art. Therefore, creation of a microscale MPIG analyzer is within the reach of presently existing scientific methods. As previously stated, mass spectrometry is already used in all areas of analysis because of its powerful ability to identify molecules present at only trace levels in the environment. Miniaturization of the analyzer would permit detection of environmental hazards, such as radioactive isotopes, radon, pesticides, and also be routinely used by law enforcement for detection of drugs, accelerants, and explosives while in the field eliminating the need to collect the samples and transport them to a laboratory for analysis.

The ability to miniaturize this type of analyzer has been studied theoretically in my laboratory using SIMION. Contained in FIG. 11B is the theoretical trajectory for an ion trapped in a parabolic electric field generated by a single MPIG electrode 12' and a flat reference electrode 44. The dimensions of this ion trap 40 have been reduced to 0.2 mm. As seen in the theoretical trajectory the ions are effectively trapped using a voltage of only −500V. Frequency analysis of the axial motion shows the same mass to frequency relationship as seen on the larger scale. This simulation confirms the ability to reduce the size of the analyzer and the voltage requirements of the MPIG.

Thus FIG. 11A gives a diagrammatical indication of a model of a simple miniaturized ion trap and FIG. 11B the simulated ion trajectory of ions trapped by such an MPIG calculated using SIMION.

Because the analyzer can reduced to this dimension, it is possible to combine a large number of MPIG electrodes in to an array sensor. This type of sensor would boost the performance of the analyzer by delocalizing the ion trap over a large number of miniature electrodes. A conceptual illustration of such an analyzer is shown in FIG. 16:

The FIG. 16 a conceptual diagram of a miniaturized MPIG array detector 50 utilizing two grid reference electrodes 44' and 46' and an array of MPIG electrodes 12' to trap and analyze trapped ions. Additional discussion of a plural MPIG array is below.

C. Plural MPIG Array Example

Basic principles about the array are as follows. Reference can also be taken to attached FIGS. 12, 13, 14, 15A and B, 16, 17A-C, 18A-C, and 19A-C.

Disclosed are examples of use of a plural MPIG array in an ion trap instrument. FIGS. 13, 16, and 17A-C and 19A-C illustrate the structure of a plural MPIG array. Diagrammatic views related to its principle of operation are also referenced. Note particularly that this embodiment permits delocalized analysis increasing both the sensitivity and the dynamic range of the instrument compared to other available methods of mass analysis.

The benefits of such a combination are discussed below. That discussion confirms compatibility of this array version with various mass analysis methods.

Tests illustrate the ability of a single chemically treated electrode to perform mass analysis, the same approach can be used to create an analyzer comprised of multiple discrete electrodes. Using several discrete electrodes permits delocalized analysis increasing both the sensitivity and the dynamic range of the instrument compared to other available methods of mass analysis. The array of MPIG electrodes would also produce a radially homogeneous electric field. By eliminating the radial inhomogeneity, the oscillatory frequencies of the trapped ions would be unaffected by motion perpendicular to parabolic field, thus resulting in increased resolution. Because the oscillatory motion is not perturbated by radial fields, ions that are injected into the analyzer would not need to be collimated or relaxed into a specific location to permit analysis. This geometry will not only simplify the trapping and detection of injected ions but also greatly improve ion trapping efficiency and therefore sensitivity. Using this approach also simplifies the introduction and collection of ions from external ion sources such as Electrospray Ionization (ESI) enhancing its effectiveness for biological samples. Finally, because of the frequency dependent motion of the ions, this analyzer is compatible with multiple established methods of ion detection.

The theoretical trajectories for ions trapped in a delocalized MPIG array mass analyzer were studied using SIMION. The trajectory of an ion trapped in the parabolic field generated by an array of twenty MPIG electrodes is shown in FIG. 13. It is important to note that the ion is not constrained by a single electrode but is free to move in a radial direction between the electrodes. The parabolic potential surface created along the axial direction is illustrated in FIG. 14.

FIGS. 13 and 14 illustrate the theoretical trajectory of an ion and cross section of the potential energy well of a delocalized MPIG array mass analyzer calculated using the ion simulation program SIMION.

The electric field traps the ions and induces a harmonic motion along the axial direction. The lack of a potential barrier between the individual electrodes results in the flat region in the center of the field. This region permits the ions to freely move in a radial direction within the center of the array. Because of the relative potential difference between the center of the array and the outside edge, the potential barrier that exists at the extremes of the array traps the ions in a radial direction. The lack of a radial component in the center of the field increases resolution because the frequency of the ion motion along the axis of the electrodes is unperturbed by radial acceleration. This results in an oscillatory frequency that is dependent only upon the mass of the ion and the potential of the electrode.

The frequency of ion motion in the MPIG array analyzer can be examined by analyzing the axial position of the theoretical trajectories of ions as illustrated in FIGS. 15A and B.

FIGS. 15A and B are plots of the axial position of an ion trapped in the array analyzer calculated by SIMION. FIG. 15A contains the axial location of an ion following a trapping time of 2000 ms. The resultant sinusoidal plot indicates the periodic motion of the trapped ion. Contained in 15B is the axial location of the trapped ion following a total trapping time of 4000 ms. Although it can be noted that the amplitude of the motion has decreased due to redirection of the ion motion in the radial direction, the frequency remained the same. This further illustrates that the frequency of the ion motion is solely related to the mass of the ion and not the radial energy.

Because the effect of radial or divergent trajectories has little or no effect on the analysis of trapped ions, this geometry is ideally suited for trapping and detection of ions produced from an external ion source. Because ions can be introduced into the trap without regard to position or radial kinetic energy, interfaces for ionization are simplified. Therefore, the proposed analyzer provides a straightforward inexpensive route to a low cost, high performance Fourier transform ion trap mass analyzer. This analyzer is ideally suited for biological samples that are commonly introduced from an external ion source.

The periodic motion of the trapped ions along the axial direction is compatible with inductive detection methods and consequently Fourier transform methods of data analysis. Inductive detection methods permit a multi-channel or Felleget advantage in signal to noise ratio relative to dispersive techniques of detection. Because there is no tradeoff between sensitivity and resolution, high resolution mass measurements are possible for this type of instrument. Furthermore, since our previous work with this instrument demonstrates the ability to eject selected ions from the ion trap for resonant detection, it is possible to eject unwanted ions from the trap for selected ion studies in an MS-MS experiment. Using the flexibility inherent in the design of this ion trap, MS-MS and MS' experiments could be made available at a lower cost to a wider range of laboratories and applications than currently have this technology.

Finally, miniaturization of the proposed analyzer is simplified because the electrodes in this instrument are created by chemical modification in contrast to mechanically changing the physical shape of the electrode as in other mass analyzers. The ability to miniaturize this type of analyzer has been studied theoretically in my laboratory using SIMION. Contained in FIG. 11B is the theoretical trajectory for an ion trapped in a parabolic electric field generated by a single MPIG electrode and a flat reference electrode (see FIG. 11A). The dimensions of the ion trap have been reduced to 0.2 mm. As seen in the theoretical trajectory, the ions are effectively trapped using a voltage of only −500V. Frequency analysis of the axial motion shows the same mass to frequency relationship as seen on the larger scale. This simulation not only confirms the ability to reduce the size of the analyzer, but also the voltage requirements of the MPIG.

Thus FIGS. 11A and B provide a theoretical model of a simple miniaturized ion trap and the simulated ion trajectory of ions trapped by the MPIG calculated using SIMION.

Because the analyzer can be reduced to this dimension, it is possible to boost the performance of the analyzer by combining a large number of MPIG electrodes into a miniaturized array. A conceptual diagram of the miniaturized MPIG array is shown in FIG. 16; a conceptual diagram of a miniaturized MPIG array detector 50 utilizing two grid reference electrodes and an array of MPIG electrodes to trap and analyze trapped ions.

One example of such a system is comprised of more than a few (e.g. twenty-two) individual MPIG electrodes 12 anchored to a single base electrode 44' and a separate reference electrode 46' that defines the potential field (see FIG. 17A).

A diagram of the proposed analyzer and the resultant potential energy field is shown in FIGS. 17B and C respectively. The depth of the potential well is a controlled by a negative bias voltage applied to end of the MPIG electrodes through the base electrode. The electric field gradient generated by the MPIG electrode is a result of the voltage difference between the potential applied to the base and to the tip of the electrode. This is controlled by a shielded feed wire at the center of the MPIG. In addition, an electrically isolated reference electrode is added at the base of the analyzer to define the boundary of the ion trap. This potential serves to create an electrostatic barrier such that any ions formed within the boundaries of the array will be trapped by the potential at the tip of the MPIG and the potential of the reference electrode. The shape of the potential well between these two extremes is defined by the thickness of the resistive polymer coating of the MPIG electrode. Though this approach, the shape of the potential well can be optimized to provide the best possible performance characteristics. In the initial test of the system, the MPIG will be constructed to create half of the parabolic well with the reference electrode acting as an electrostatic mirror generating a complete parabolic well. Although multiple shapes have been tested in our laboratory, previous experiments have indicated that this geometry provides the greatest flexibility for evaluating performance.

FIGS. 18A-C illustrate ion detection using an electron multiplier by ion ejection with a resonant rf electric field.

Ion detection can be accomplished with an electron multiplier using resonant ion ejection similar to mass instability detection schemes in a quadruple ion trap mass spectrometer. This detection method has been previously tested in the single electrode MPIG analyzer, and permits us to evaluate trapping and detection of ions formed from different ionization methods (e.g., Electron impact ionization, Laser desorption, and Electrospray ionization). The process is illustrated in FIGS. 18A-C. Ions can be produced in the center of the array by electron impact of volatile samples. Electron impact ionization was selected for the primary test of the MPIG array mass analyzer because it provides a reliable baseline with consistent ion formation. Following ion formation, ions will be trapped within the boundaries of the potential well with random locations and velocity vectors. After a stabilization delay, an rf voltage will be applied to the reference electrode (FIG. 18B). As the ions trapped within the MPIG array come into resonance with the applied electric field, they will gain translational energy along the axis of the ion trap. When the energy of the ions becomes greater than potential boundary of the trap, they will exit and be accelerated into an electron multiplier detector.

A solid insertion probe compatible with laser desorption can be used to create ions. As in previous experiments, Cesium Iodide can be ionized using a Continuum pulsed Nd:YAG laser. Cesium Iodide's ability to produce high molecular weight clusters allows us to investigate the effect of mass on both resolution and ion storage. In order to demonstrate the utility of the technique, ions formed from an external ESI source can be directly injected into the ion trap. These experiments evaluate the ability of the MPIG array to trap and analyze externally produced ions, as well as to and determine the effective mass range of the instrument. Part of the advantages of this design is the ease in which ionization sources can be interchanged with little or no inconvenience to the operator.

In addition to ion detection using an electron multiplier, the periodic motion of ions can also be detected using inductive detection techniques. A diagram of inductive detection followed by Fourier transform analysis is illustrated in FIGS. 19A-C.

FIGS. 19A-C are illustrations of inductive detection and Fourier transform analysis in the proposed MPIG array mass analyzer.

Ions are once again formed within the center of the MPIG array and trapped in the potential field. By application of either a rapid sweep of rf frequency range (i.e., chirp excitation) or a short dc pulse (i.e., impulse excitation) the entire mass range of ions trapped in the array will be accelerated to higher kinetic energies and driven into coherent motion (FIG. 19B). Owing to the ability of the coherent ion packets to spread out in a radial direction throughout the full cross section of the array, it is possible to collect and trap larger numbers of ions without the effects of ion-ion repulsion. This increases the dynamic range and enhances inductive detection by utilizing larger ion densities. In such an experiment, a charge fluctuation generated by the motion of the ions can be detected by placing a low noise amplifier between the reference electrode and a detection electrode located at the tip of the MPIG electrodes. The image current that is generated can be digitized and analyzed using Fourier transform or other frequency analysis methods. As mentioned previously, this method provides an inherent increase in the signal-to-noise ratio because all of the ions are simultaneously detected.

Inductive detection methods and subsequent Fourier analysis also provide the potential for in-depth investigations of molecular structure or compound reactivity though MS-MS experiments For example, as demonstrated in previous experiments, ions can be accelerated out of the trap using a resonant rf electric field. The ability to selectively remove ions provides the basis for isolating ions of a single mass within the trap. When analyzing a mixture or complex structure, this allows a specific ion to be selected for further study in order to examine its specific mass spectrum or chemical reactivity. Because ions can be stored in the trap for extended periods of time, the variety of the experiments possible are almost unlimited. Thus, this analyzer provides the power and flexibility of other Fourier transform instruments without the associated cost.

We built and tested multiple systems that used MPIG electrodes as analyzers. Different shaped fields including full parabolic fields and half parabolic fields were constructed and tested. Theoretical trajectory studies have been done for the development of a multi-electrode array analyzer. The results of these studies clearly show that by creating a true parabolic well without radial inhomogeneities, ion trapping and resolution are enhanced. Further, the system has already demonstrated the ability to perform resonant ion ejection which permits MS-MS and $MS^n$ experiments. This enables enhanced selectivity as well as flexibility in ion identification.

Examples of tests include: (a) resonant detection using selected ion acceleration and electron multiplier detector (create ions using electron impact and create ions using laser desorption of CSI; (b) inductive detection and Fourier analysis using the back plate of the ion trap as a detector; (c) ion isolation using resonant ejection and subsequent detection of remaining ions (MS-MS and $MS^n$); (d) evaluation of mass resolution, trapping efficiency, and sensitivity/dynamic range enhancements; and (e) continue development of resistive polymer electrodes.

An optional application may be evaluation of high mass performance characteristics using an external source Electrospray Ionization (ESI) ionization method. An additional advantage of this system is that ions can be simply introduced into a delocalized trap. This makes adaptation to external ion formation simple. Adapting ESI and other atmospheric pressure sources permits this analyzer to be ideal for high mass introduction and analysis therefore providing gains in sensitivity for biomolecule analysis.

As mentioned above, miniaturization using the above concepts is possible. The design of the MPIG array analyzer simplifies ion introduction and trapping compared to other mass analyzers. Because there is no radial component in a delocalized analyzer, ions can be sprayed into the trap without having to collisionally cool or squeeze the radial motion. Trajectory studies show that ions that are deflected in a radial direction maintain the same axial frequency at lower amplitude (true harmonic oscillator). The ion trap effectively preconcentrates the sample by ionizing and collecting ions over a long period of time, thus improving the limits to detection. Because the ions are delocalized over a wider area, more ions can be detected without space charge interferences, thus increasing both dynamic range and sensitivity.

One of the most powerful outcomes of this research is the development of a mass analyzer that can provide the power and flexibility to conduct extensive mass spectrometry studies without the cost or upkeep of the typical high performance instruments. Reducing the cost while expanding the range of applications is enhanced by both the simplicity of the design coupled with potential for miniaturization. The reduction of size and cost of the instrument will allow mass spectrometry experiments of the type described in this proposal to be performed in a wider range of laboratories both academic and industrial. In addition, as this type of technology continues to develop, mass analyzers will become routine instrumentation throughout all the scientific disciplines. As the need for more specific information increases within our society, so does our need to develop new methods of instrumentation that can be made widely available.

D. Options and Alternatives

As will be appreciated by those skilled in this art, the invention is not limited to the specific forms and embodiments presented herein. Variations obvious to those skilled in the art will be included.

For example, specific configurations of the components, including the specific shape and characteristics of the coating of the modified MPIG, can vary according to need or desire by those skilled in the art. Likewise, operating parameters for any of the configurations can be varied and selected by those skilled in the art according to desire or need for a given situation.

Additionally, the scale of the instrument can vary according to need or desire.

Still further, the specific mode of operation of the ion trap instrument can vary, as intimated above. Likewise, combination with linked or integrated other tests or methods is discussed.

The apparatus, systems, and methods of the invention can also be applied to a wide variety of analytes.

The specific examples given herein are by way of example and not limitation.

TABLE OF CITATIONS i. Vestal, M. *J.A.S.M.S.,* 2011, 22(6), 953-959 ii. Beck, H. *Methods in Molecular Biology* 2010, 593, 263-282 iii. Hanson, C.; Simet, I.; Smith, S., *J. Iowa Academy of Science,* 1993, 100, 1-8.

iv. Hanson, C.; Castro, M.; Russell, D.; Hunt, D.; Shabanowitz, J. Fourier Transform Mass Spectrometry: Evolution, Innovation, and Applications, *ACS Symposium Series* 359, *Chapter* 6, 1988, Ed. M. V. Buchanan v. Li, Y.; Su, X.; Stahl, P.; Gross, M. *Anal. Chem* 2007, 79(4), 1569-1574 vi. McLean, J.; Ruotolo, B.; Gillig, K.; Russell, D. *Int. J. Mass Spect.* 2005, 240(3), 301-315.

vii. Cologna, S.; Russell, W.; Lim, P.; Vigh, G.; Russell, D. *J.A.S.M.S.* 2010, 21(9), 1612-1619 viii. Fenn, J.; Mann, M.; Meng, C; Wong, S.; Whitehouse, *Science,* 1989, 24(4926) 64-71 ix. Subhodaya, A.; Chait, B. *Anal. Chem.,* 1991, 63 (15), 1621-1625 x. Liu, J; Wang, H; Manicke, N.; Lin, J; Cooks, R. *Anal Chem* 2010, 82(6), 2463-2471 xi. Todd, J. *Chemical Analysis* 1989, 102, 1-30, 445-9 xii. Curtiss D. Hanson, Eric L. Kerley, David H. Russell, Recent Developments in Experimental FT-ICR, *Treatise on Analytical Chemistry, Second Edition, Part* 1, *Volume* 11, *Chapter* 2, 1989, Ed. M. Bursey. J. Wiley Publ xiii. Hu, Q Z; Noll, R J; Li, H Y; Makarov, A; Hardman, M; Cooks, R G *J. Mass Spec.* 2005, 40 (4): 430-443.

xiv. Bruce, J.; Anderson, G.; Smith, R. *Anal. Chem.,* 1996, 68 (3), 534-541 xv. Kingdon K H 1923, 21(4): 408-418 xvi. Oakey, N.; Macfarlane, R. *Nucl. Instrum. Methods,* 1967, 49, 220-228.

xvii. Geno, P.; Macfarlane, R. *Int. J. Mass Spectrom. Ion Proc.* 1986, 74, 43-57.

xviii. Brown, R.; Gilfrich, N. *Rapid Commun. Mass Spectrom.* 1992, 6, 697-701.

xix. Wolf, B.; Macfarlane, R. *J.A.S.M.S.* 1992, 3, 706-715.

xx. Geno, P.; Macfarlane, R. *Int. J. Mass Spectrom. Ion Proc.* 1986, 74, 43-57.

xxi. Just, C. L.; Hanson, C. D. *Rapid Comm. Mass Spectrom.* 1993, 7, 502-506.

xxii. Hanson, C.; Just, C. *Anal. Chem.,* 1994, 66, 3676-3680 xxiii. Hanson, C. U.S. Pat. No. 6,013,913, 2000.

xxiv. Hanson, C. Anal. Chem. 2000, 72, 448-453 xxv. Hanson, C.; Trent, P. U.S. Pat. No. 6,657,190, 2003 xxvi. Schulten, H., Lattimer, R. Mass Spectrometry Reviews 2005, 3, 233 xxvii. Richarsaon, S. D. Analytical Chem. 2006, 78, 4021 xxviii. Fenselau, C. Anal. Chem. 1982, 54, 105A xxix. Cooks, R. G., Busch, K. L., Glish, G. L. Science, 1983, 222, 273 xxx. Burlingame, A. L., Whitney, J. I., Russell, D. H. Anal. Chem. 1984, 56, 363R xxxi. Hanson, C. D., Kerley, E. L., Russell, D. H. Treatise on Analytical Chemistry, Chapter 2, Ed. J. D. Weinford, Pub. J. Wiley and Sons, 1989 xxxii. Markarov, A. Analytical Chem. 2000, 72, 1156 xxxiii. Hu, Q., Noll, R. J. J. Mass Spectrom. 2005, 40, 430 xxxiv. Bonner, R.; Lawson, G.; Todd, J.; March, R. Adv. Mass Spectrom. 1974, 6, 377 xxxv. Fulford, J.; March, R. Int. J. Mass Spectrom. Ion Phys. 1978, 26, 155 xxxvi. McIver, R. T. Rev. Sci. Instrum. 1970, 41, 555 xxxvii. Hanson, C. D.; Castro, M. E.; Kerley, E. L.; Russell, D. H. Anal. Chem. 1990, 62, 520 xxxviii. Neuhauser, W.; Hohenstatt, M.; Toschek, P. E.; Dehmelt, H. Phys. Rev. A 1980, 22, 1137 xxxix. Allison, J.; Stepnowski, R. M. Anal. Chem. 1987, 59, 1072A xl. Hanson, C. D., et al., U.S. Pat. No. 6,657,190, Variable Potential Ion Guide 2003

What is claimed is:

1. An elongated electrode assembly having opposite ends for use across an ion trap in an ion mass analyzer comprising:

a. an electrical insulator having a longitudinal axis, an outer surface, and a length between opposite ends of the electrode assembly;

b. a coating applied to the surface of the insulator of a pre-determined semi-conducting material and thickness defining a resistivity relative to the length of the insulator; and c. a circuit through the coating comprising:

i. an electrically conductive feed wire at least partially along the longitudinal axis of the insulator and adapted for connection to a source of electrical energy; and ii. an electrical connection to the coating;

d. so that user-defined electric fields of different potential field shapes for ion trapping can be created by altering resistivity of the coating by selection of the semi-conducting material and variation of the thickness of the coating along the insulator.

2. The electrode assembly of claim 1 wherein the thickness is an approximately constant thickness.

3. The electrode assembly of claim 2 wherein the feed wire extends from one end of the insulator to the opposite end, the combination producing a potential difference between opposite ends which, in turn, produces a one-half parabolic shaped potential field between opposite ends of the electrode assembly when electrical energy is supplied to the circuit, and further comprising:

a. a plurality of adjacent but spaced-apart ring-shaped reference electrodes each surrounding but concentrically spaced from the electrode assembly along its longitudinal axis;

b. an endcap grid electrode at one end of the electrode assembly which can selectively function as an electrostatic minor and a repeller plate at the opposite end of the electrode assembly which can cooperate with the grid electrode to retain ions along the electrode assembly; and c. a controllable electrical power source to control voltage to the electrode assembly, endcap grid electrode and repeller.

4. The electrode assembly of claim 3 further in combination with an ion mass analyzer comprising one or more of:

a. an ion source;

b. an ion detector; and c. an ion mass spectrometer.

5. The electrode assembly of claim 1 wherein the thickness varies.

6. The electrode assembly of claim 5 wherein the thickness increases from opposite ends to a middle section of the insulator, the feed wire extends from one end of the insulator to the opposite end, the combination producing a potential difference between opposite ends which, in turn, produces a full parabolic shaped potential field between opposite ends of the electrode assembly when electrical energy is supplied to the circuit, and further comprising:

a. a plurality of adjacent but spaced-apart ring-shaped reference electrodes each surrounding but concentrically spaced from the electrode assembly along its longitudinal axis;

b. an endcap grid electrode at one end of the electrode assembly which can selectively function as an electrostatic minor to retain ions along the electrode assembly; and c. a controllable electrical power source to control voltage to the electrode assembly, endcap grid electrode.

7. The electrode assembly of claim 5 wherein the thickness increases from opposite ends to a middle section of the insulator, the feed wire extends from one end of the insulator to the middle section, the electrical connection is at one end of the coating, and the circuit further comprises a second electrical connection at the opposite end of the coating, the combination emulating a voltage divider producing a parabolic shaped potential field between opposite ends of the electrode assembly when electrical energy is supplied to the circuit.

8. The electrode assembly of claim 1 in combination with a plurality of additional said electrode assemblies each positioning generally parallel and spaced apart from one another in an array.

9. The electrode assembly of claim 8 wherein each elongated electrode assembly of the array is positioned at one of its opposite ends at a supply electrode and reference electrode combination and extends away to the other opposite end.

10. The electrode assembly of claim 8 wherein each elongated electrode assembly of the array is positioned at one of its opposite ends in an end cap electrode and at its other opposite end in another endcap electrode.

11. A method of making an elongated electrode assembly having opposite ends for use across an ion trap in an ion mass analyzer comprising:

a. providing an electrical insulator having a longitudinal axis, an outer surface, and a length between opposite ends of the electrode assembly;

b. coating the surface of the insulator with a semi-conducting material at a thickness along at least a portion of the insulator defining a resistivity relative to that portion of the insulator.

12. The method of claim 11 further comprising forming a circuit path through the coating comprising:

i. an electrically conductive feed wire at least partially along the longitudinal axis of the insulator and adapted for connection to a source of electrical energy; and ii. an electrical connection to the coating.

13. The method of claim 12 wherein the coating comprises depositing a semi-conductive polymer material at a controlled thickness to the surface of the insulator.

14. The method of claim 13 wherein the thickness is generally constant.

15. The method of claim 14 wherein the thickness varies.

16. The method of claim 15 wherein the thickness increases from opposite ends to a middle section of the insulator.

17. An ion mass analyzer comprising:

a. a housing defining an ion trap chamber;

b. an electrical power source;

c. at least one elongated multi-potential ion guide across the ion trap chamber, the ion guide comprising a controlled-thickness semi-conductive coating applied to a non-conducting substrate and a circuit operatively connectable to the electrical power source to provide a voltage difference between different locations along the ion guide;

d. a reference voltage electrode in proximity of the ion guide; and e. a source of ions in communication with the ion trap chamber.

18. The analyzer of claim 17 wherein the thickness of the coating is varied along the substrate to produce a parabolic potential field along the ion guide.

19. The analyzer of claim 18 wherein the ion guide is scalable from centimeter scale, to micro-scale, to nano-scale.

20. The analyzer of claim 19 wherein the at least one elongated multi-potential ion guide comprises a plurality of generally parallel and equally spaced apart elongated multi-potential ion guides.

* * * * *

UNITED STATES PATENT AND TRADEMARK OFFICE

CERTIFICATE OF CORRECTION

PATENT NO. : 9,190,254 B1
APPLICATION NO. : 14/570529
DATED : November 17, 2015
INVENTOR(S) : Curtis Dwight Hanson It is certified that error appears in the above-identified patent and that said Letters Patent is hereby corrected as shown below:

IN THE CLAIMS

Column 20, Claim 3(b), Line 27:

After the word static, delete "minor" and insert --mirror--.

Column 20, Claim 6(b), Line 55:

After the word static, delete "minor" and insert --mirror--.

Signed and Sealed this
Eighth Day of March, 2016

Michelle K. Lee
*Director of the United States Patent and Trademark Office*